US012323695B2

(12) United States Patent
Takahashi

(10) Patent No.: US 12,323,695 B2
(45) Date of Patent: Jun. 3, 2025

(54) DISPLAY DEVICE

(71) Applicant: FUJIFILM Corporation, Tokyo (JP)

(72) Inventor: Kosuke Takahashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 195 days.

(21) Appl. No.: 18/345,741

(22) Filed: Jun. 30, 2023

(65) Prior Publication Data

US 2024/0007737 A1    Jan. 4, 2024

(30) Foreign Application Priority Data

Jul. 1, 2022    (JP) ................................. 2022-107095

(51) Int. Cl.
     *H04N 23/63*      (2023.01)
     *G06F 3/01*      (2006.01)

(52) U.S. Cl.
     CPC ........... *H04N 23/632* (2023.01); *G06F 3/013* (2013.01)

(58) Field of Classification Search
     CPC .... H04N 23/632; H04N 23/69; H04N 23/631; H04N 23/683; H04N 23/62; H04N 23/6812; G06F 3/013
     USPC .................................................. 348/333.12
     See application file for complete search history.

(56) References Cited

U.S. PATENT DOCUMENTS

| | | | | |
|---|---|---|---|---|
| 9,829,975 | B2* | 11/2017 | Weber | G06F 3/0304 |
| 10,061,384 | B2* | 8/2018 | Noda | G03B 13/10 |
| 10,915,170 | B2* | 2/2021 | Yu | G06F 3/013 |
| 11,076,147 | B2* | 7/2021 | MacKenzie | H04N 13/398 |
| 11,412,140 | B2* | 8/2022 | Nagai | G06F 3/013 |
| 2018/0039327 | A1* | 2/2018 | Noda | H04N 23/64 |
| 2019/0220091 | A1* | 7/2019 | Yu | G06F 1/1601 |
| 2021/0034150 | A1* | 2/2021 | Hagiwara | G06V 40/18 |
| 2021/0368100 | A1* | 11/2021 | Nagai | H04N 23/63 |
| 2021/0400197 | A1* | 12/2021 | Sato | H04N 23/633 |
| 2023/0328357 | A1* | 10/2023 | Ogawa | H04N 23/667 |
| | | | | 396/51 |

FOREIGN PATENT DOCUMENTS

| | | |
|---|---|---|
| JP | 2004-215062 A | 7/2004 |
| JP | 2016-103680 A | 6/2016 |

\* cited by examiner

*Primary Examiner* — Pritham D Prabhakher
(74) *Attorney, Agent, or Firm* — Studebaker Brackett PLLC

(57) ABSTRACT

A digital camera includes a finder part, a distance-measuring sensor, a relative position detection sensor, and a display controller, and the display controller calculates a first relative movement amount according to a relative position detected by the relative position detection sensor and calculates a second relative movement amount obtained by performing smoothing processing of the first relative movement amount, and moves a display region within a display based on the second relative movement amount. The finder part includes the display and a finder lens.

18 Claims, 19 Drawing Sheets

FIG. 6
(A)
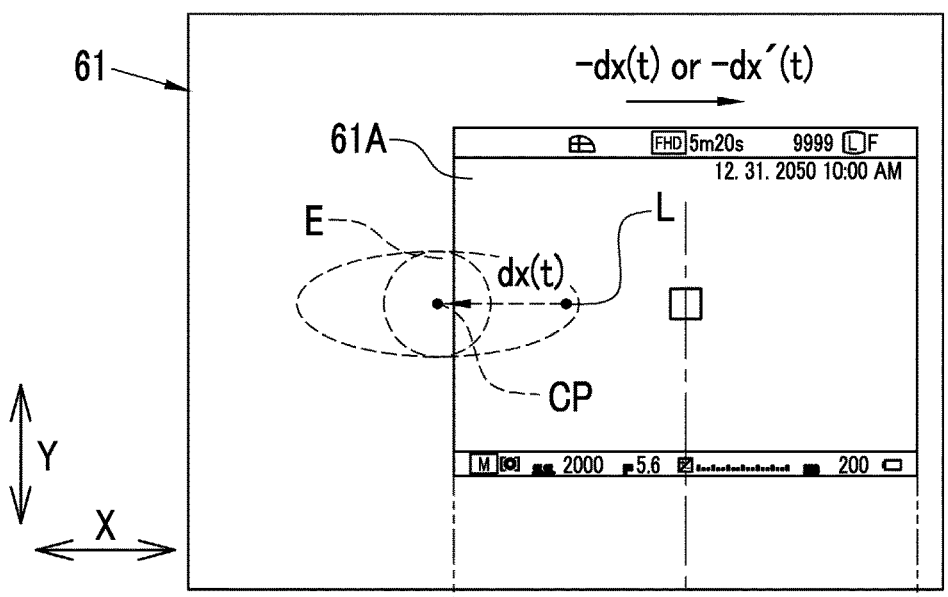
(B)
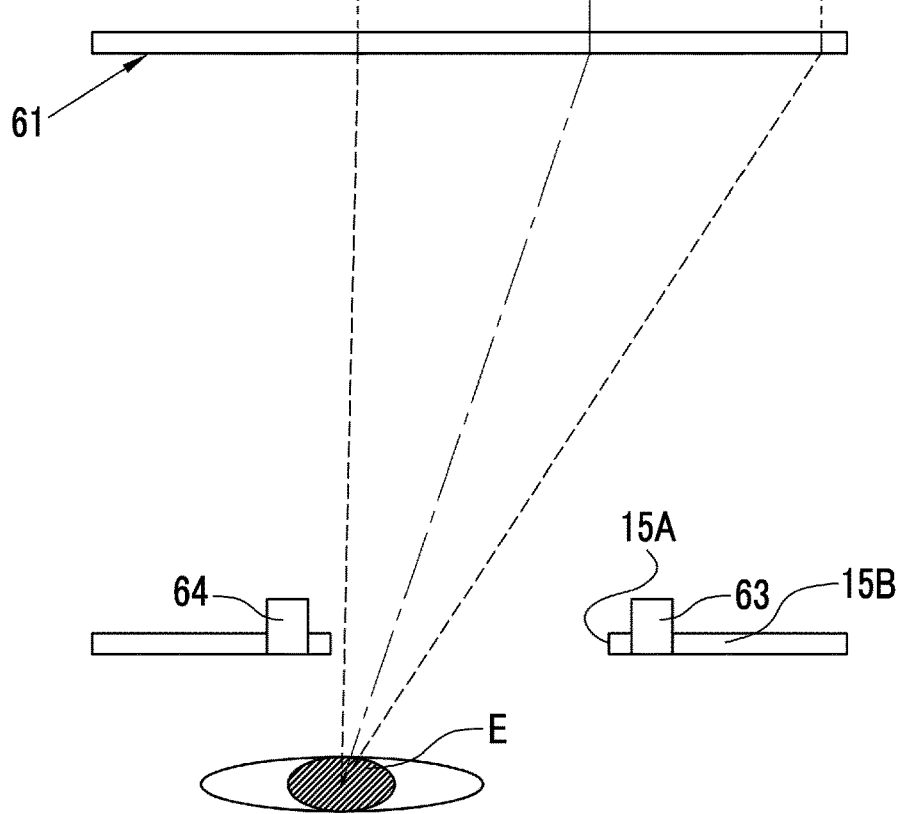

FIG. 7
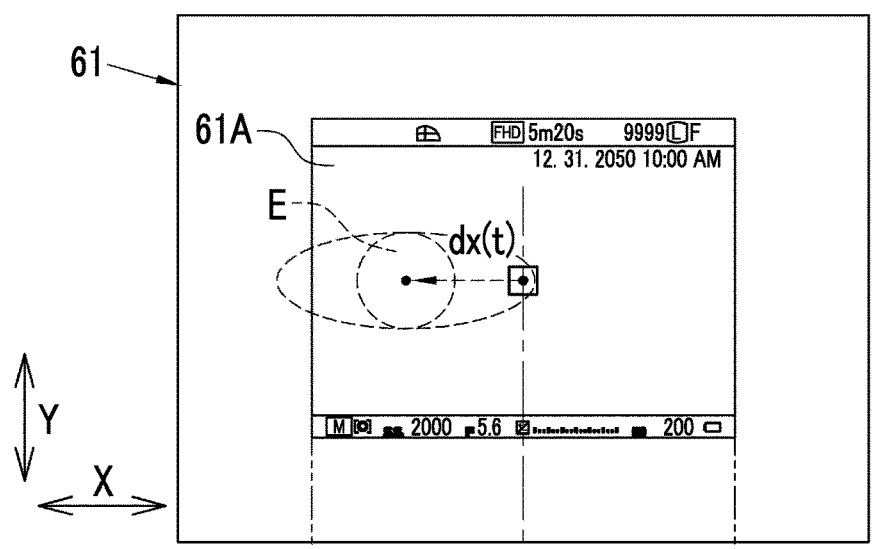
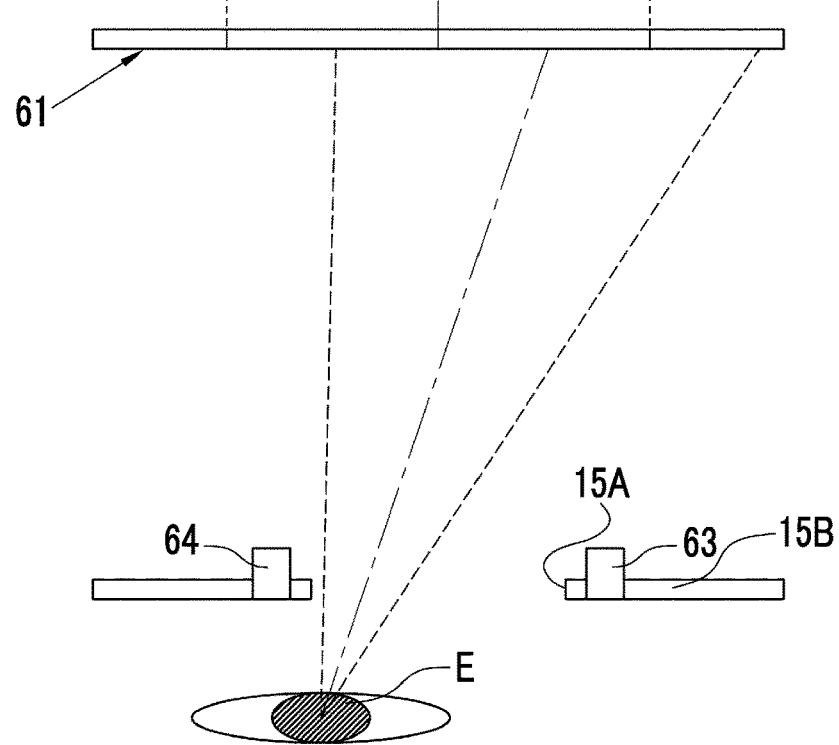

FIG. 9
(A)
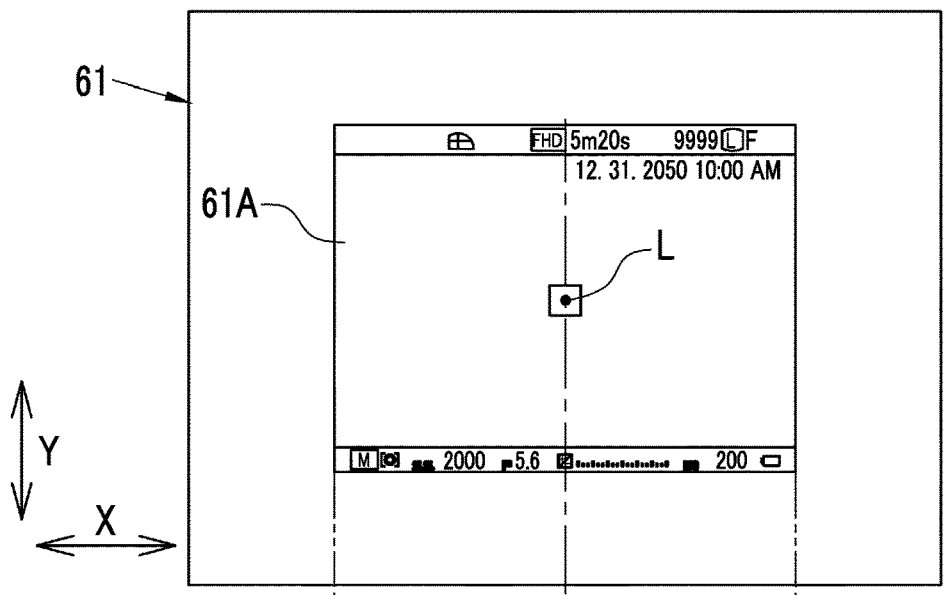
(B)
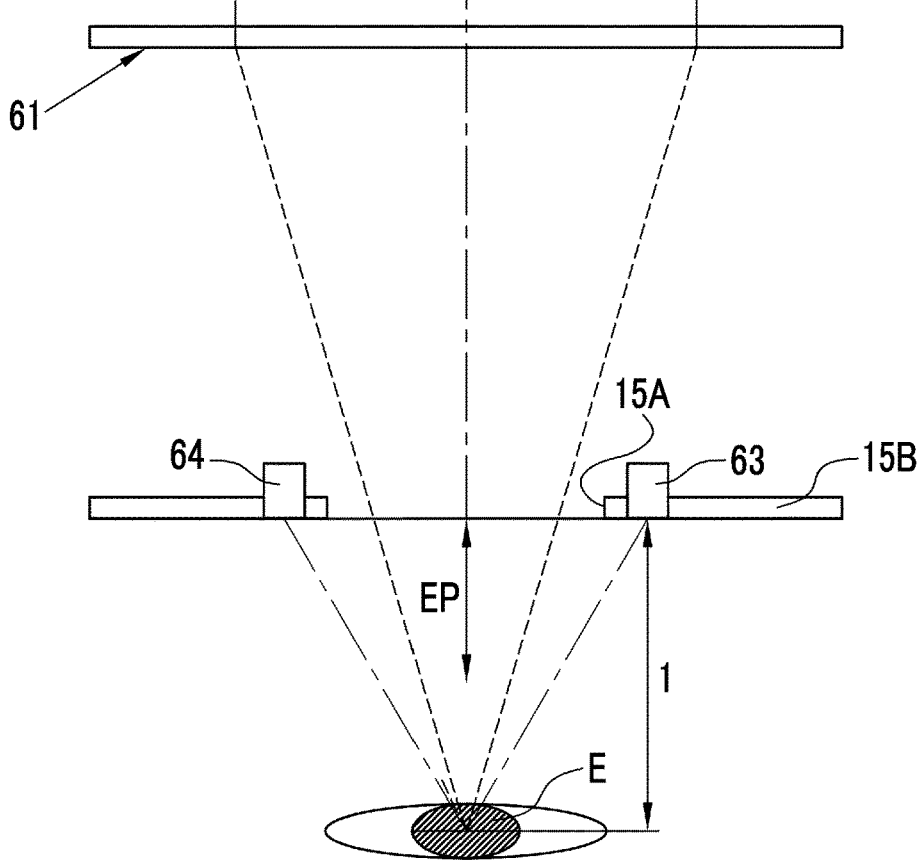

FIG. 10
(A)
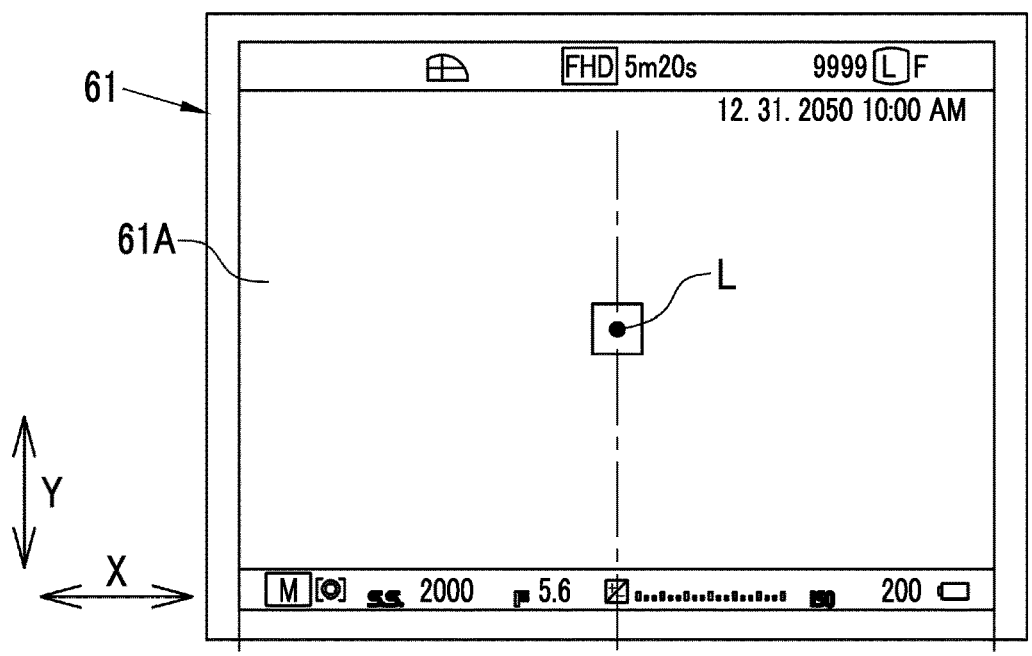
(B)
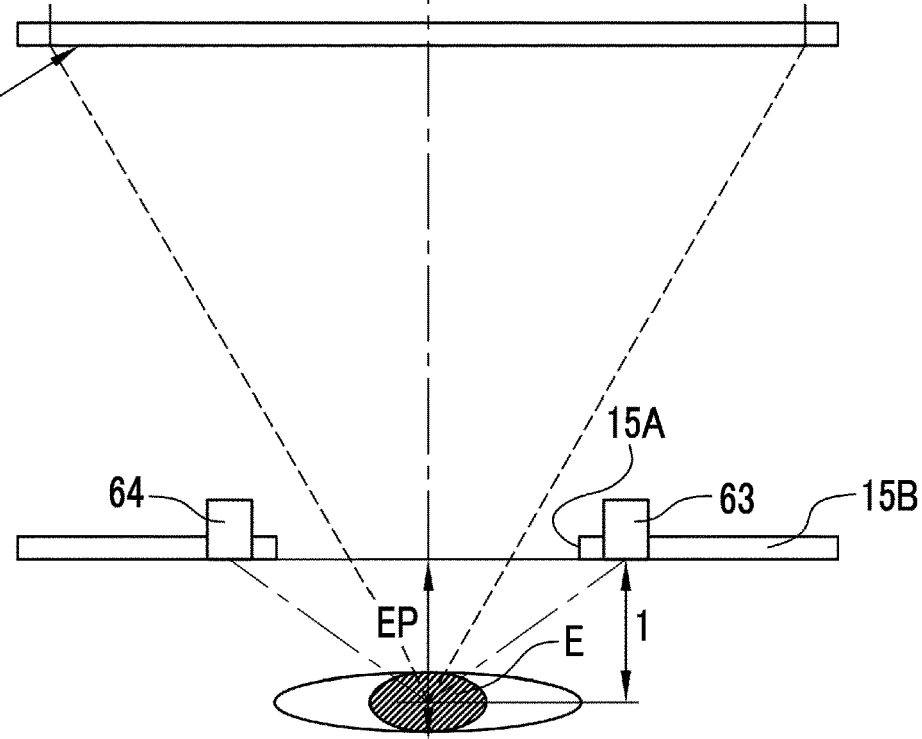

FIG. 13
(A)
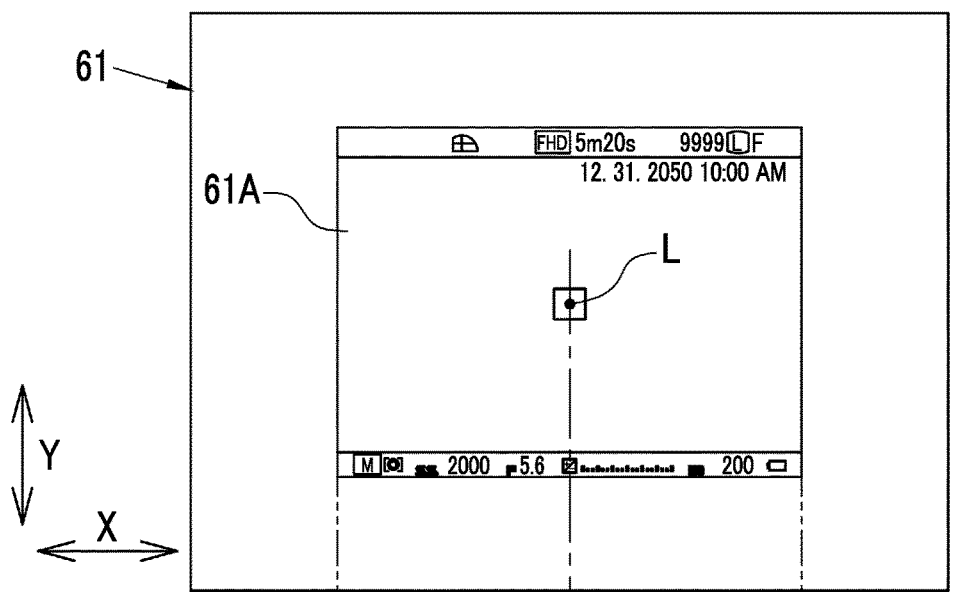
(B)
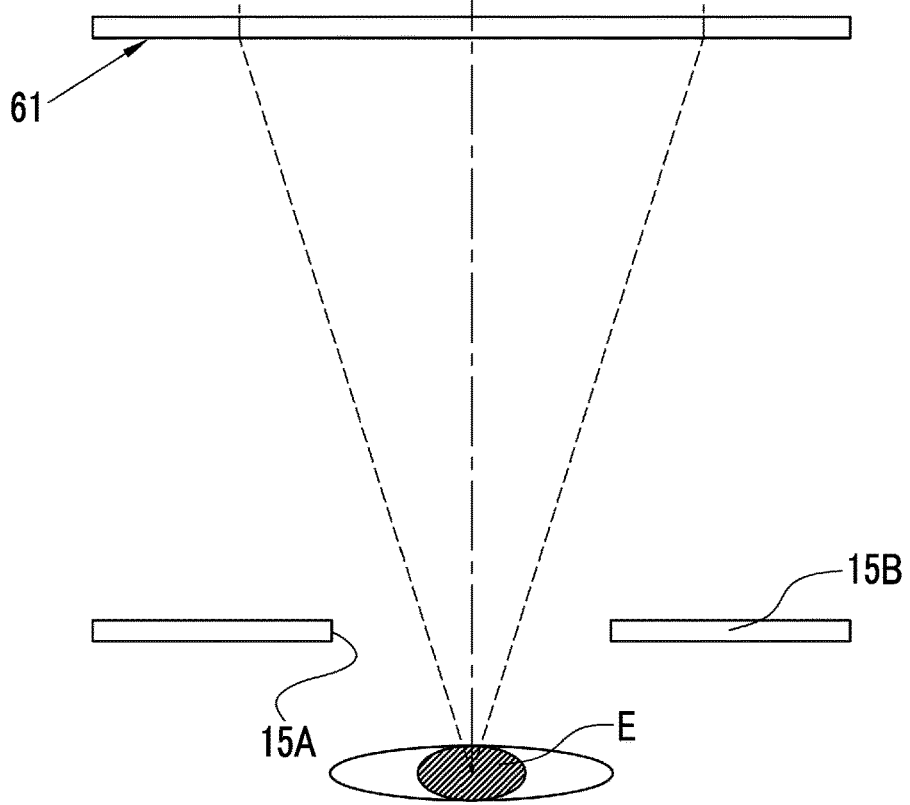

FIG. 14
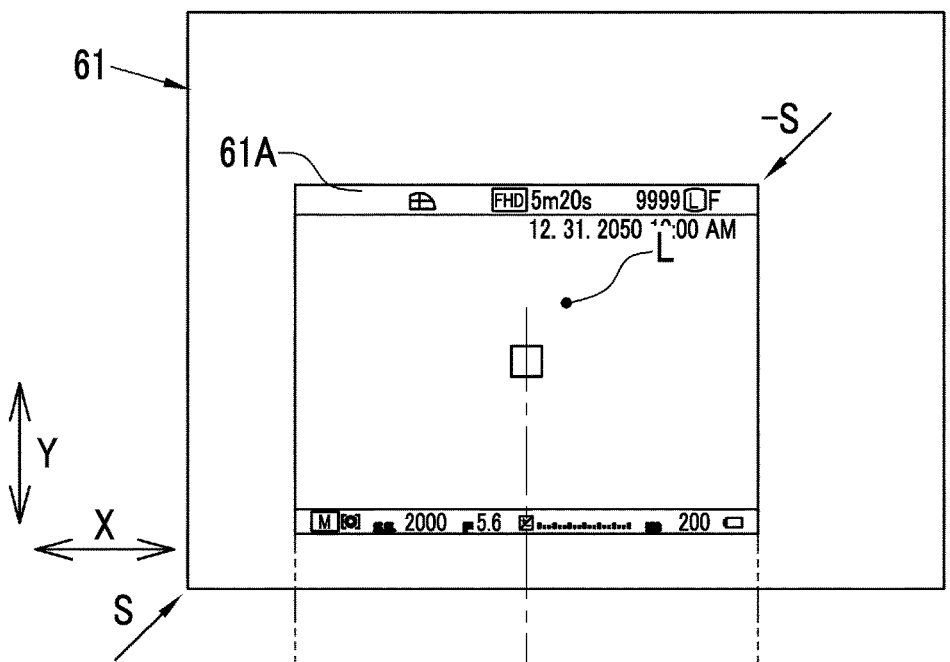
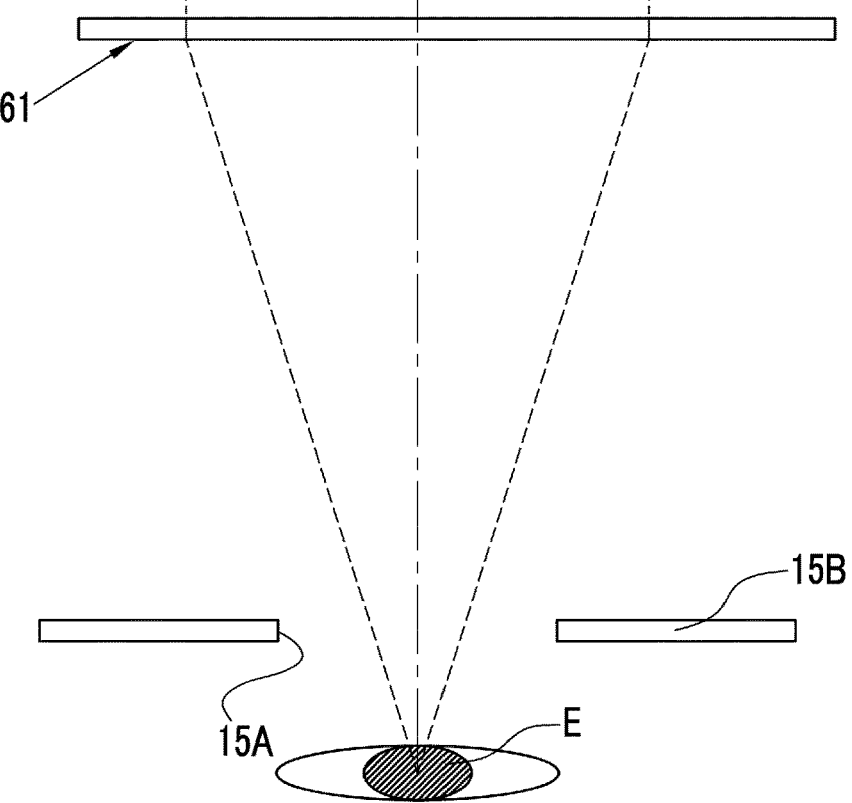

FIG. 16
(A)
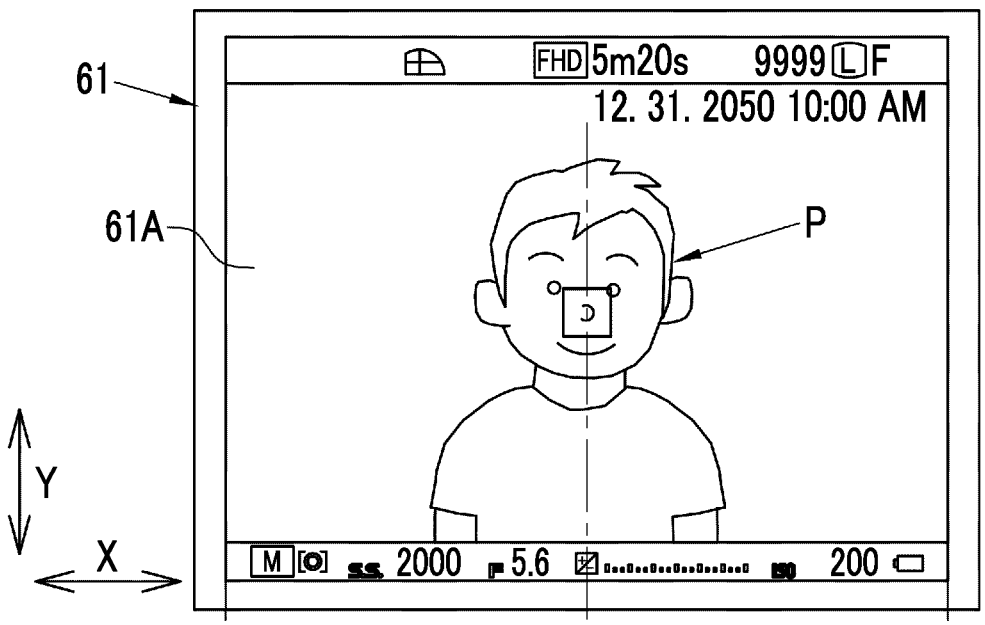
(B)
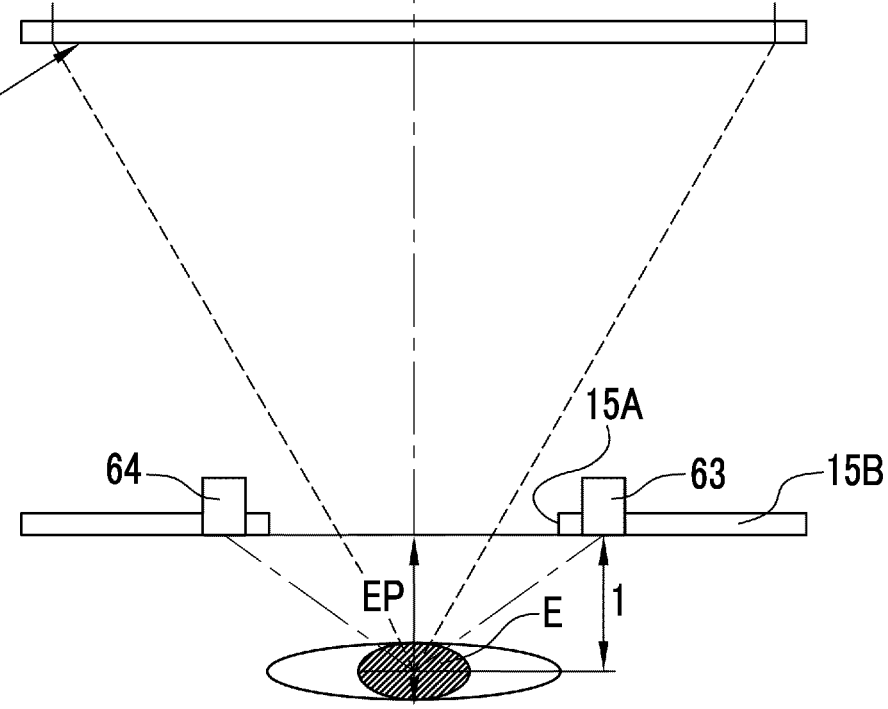

FIG. 17
(A)
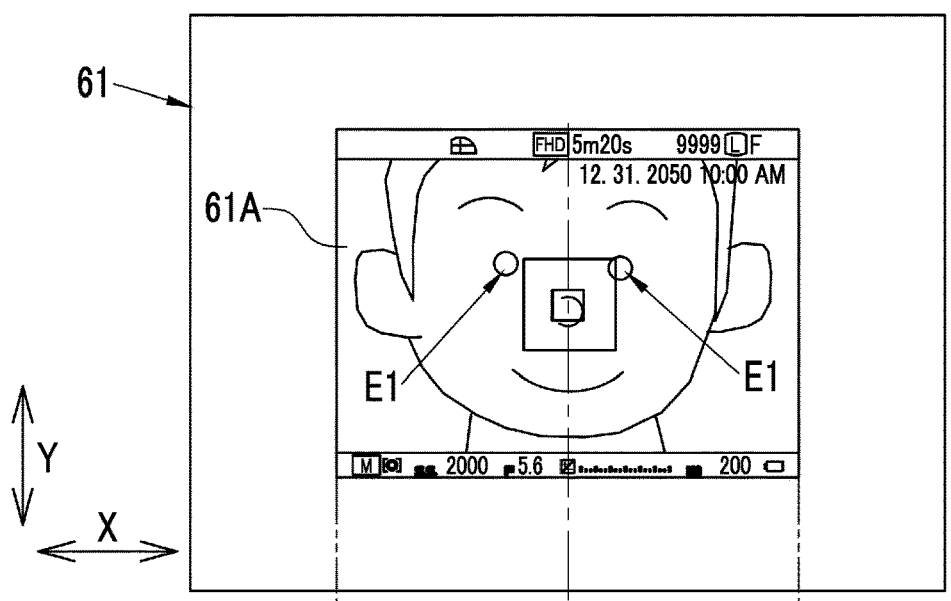
(B)
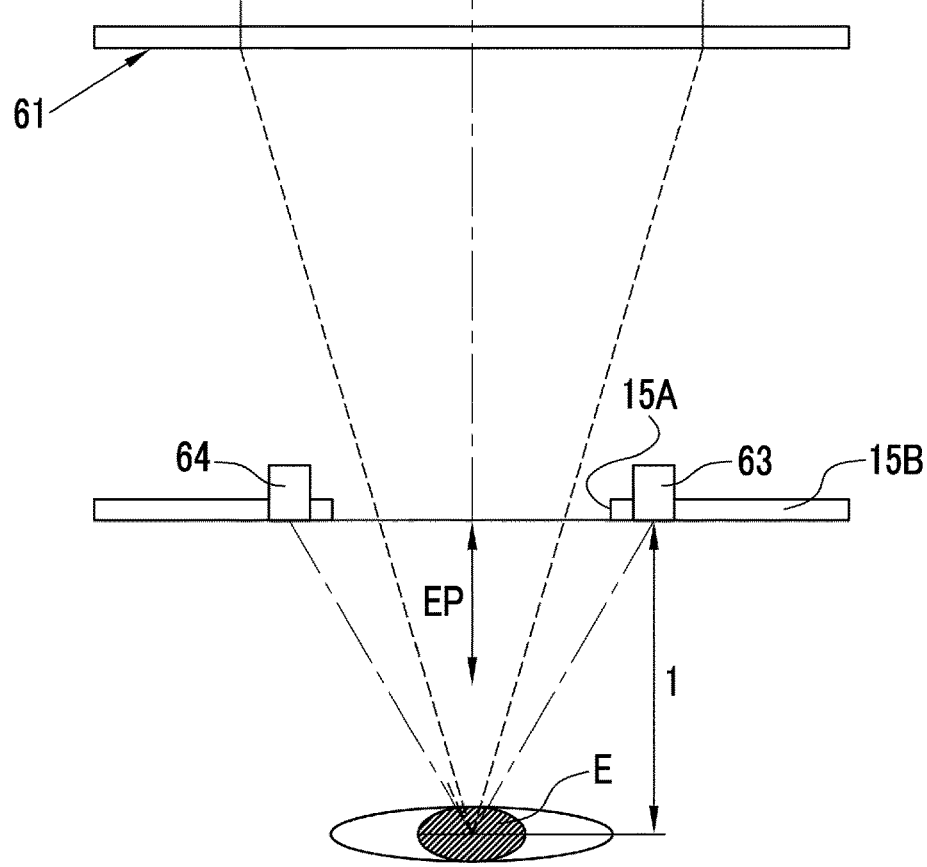

FIG. 19
(A)
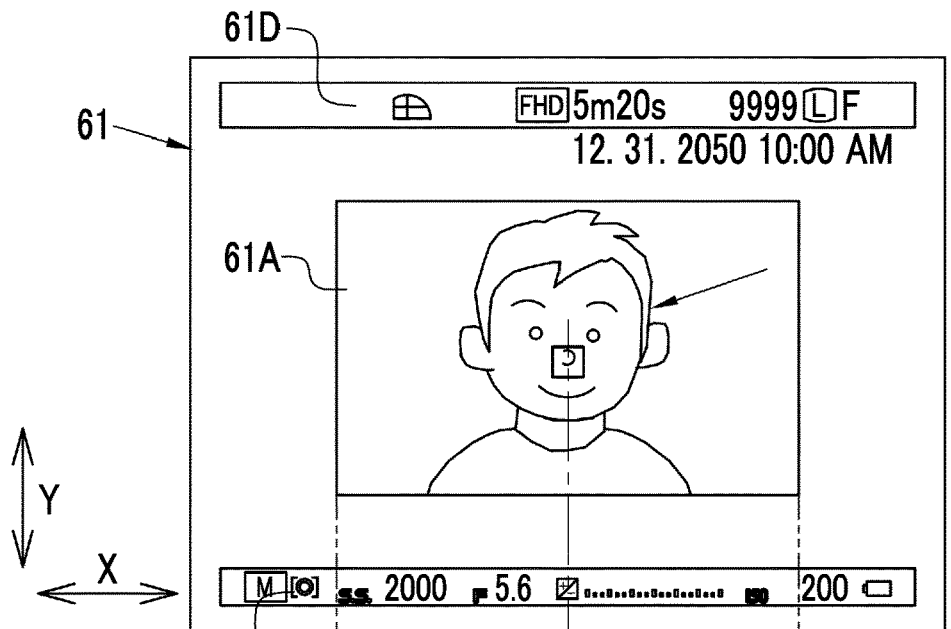
(B)
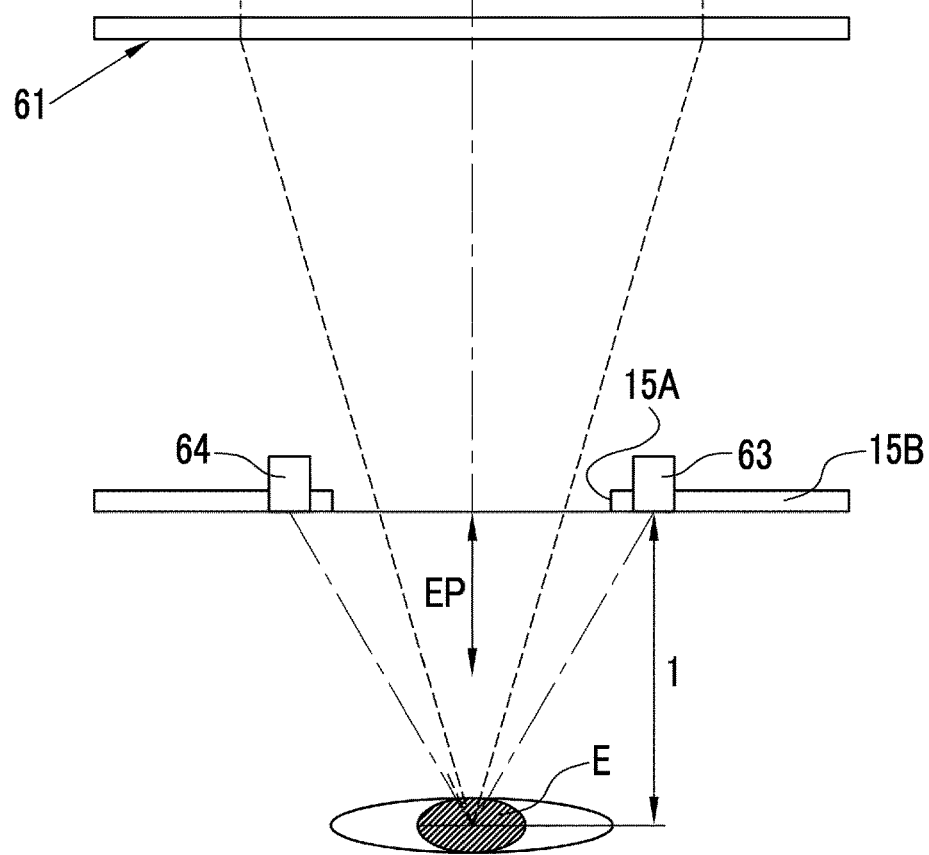

DISPLAY DEVICE

CROSS-REFERENCE TO RELATED APPLICATIONS

This application claims priority under 35 U.S.C § 119(a) to Japanese Patent Application No. 2022-107095 filed on 1 Jul. 2022. The above application is hereby expressly incorporated by reference, in its entirety, into the present application.

BACKGROUND OF THE INVENTION

1. Field of the Invention

The present invention relates to a display device.

2. Description of the Related Art

JP2004-215062A discloses a finder part (display device) that is provided with an image display part that displays an electronic image and is configured to visually recognize the image displayed on the image display part via a finder window. A distance-measuring sensor and a line-of-sight detection sensor are provided in the finder part. The distance-measuring sensor measures a distance between a user who visually recognizes the finder window and the finder window, and a magnification determination unit determines a reduction ratio of a display image according to the distance obtained as a result. Then, a reduced image corresponding to the reduction ratio is displayed on the image display part. In addition, the line-of-sight detection sensor detects a line-of-sight direction of the user looking through the finder window, and a partial image visually recognized by the user is trimmed and displayed at a center of a screen of the image display part.

In addition, an electronic view finder (display device) disclosed in JP2016-103680A comprises a display unit capable of displaying a captured image and imaging information, an eyepiece lens, and an eye position detection unit that measures a distance from a finder eyepiece frame and an eye of an imaging person, in which a display magnification of at least one of the captured image or the imaging information is adjusted based on a distance measurement result measured by the position detection unit, and the display magnification is decreased as the distance measurement result measured by the position detection unit increases.

SUMMARY OF THE INVENTION

One embodiment according to a technology of the present disclosure provides a display device capable of reliably visually recognizing a display image.

A display device according to a first aspect according to a technology of the present disclosure comprises: an observation optical system; a distance-measuring sensor; a relative position detection sensor; and a processor, in which the processor calculates a first relative movement amount according to the relative position detected by the relative position detection sensor, calculates a second relative movement amount obtained by performing processing with respect to a time direction of the first relative movement amount, and moves a display region within the display based on the second relative movement amount. The observation optical system includes the display and an optical member. The distance-measuring sensor measures a distance from the observation optical system to an eye of an imaging person. The relative position detection sensor detects a relative position between the observation optical system and the eye of the imaging person.

It is preferable that the processing with respect to the time direction is processing of smoothing a change in the time direction of the first relative movement amount. It is preferable that the processing of smoothing the change is processing of performing a product-sum operation. It is preferable that the processing of performing the product-sum operation is low pass filtering or moving averaging.

It is preferable that the processor changes a display size of a display image based on a measurement distance. It is preferable that the processor compares the measurement distance measured by the distance-measuring sensor with an eye point reference value, reduces the display region where the display image is displayed on the display in a case in which the measurement distance exceeds the eye point reference value, and enlarges the display region in a case in which the measurement distance is equal to or less than the eye point reference value.

It is preferable that the processor switches the processing in the time direction according to a change amount of the first relative movement amount. It is preferable that the processor moves the display region based on the first relative movement amount without performing the processing of smoothing the change with respect to the first relative movement amount, in a case in which the first relative movement amount exceeds a threshold value.

It is preferable that the display device further comprises: a shake detection sensor that detects a shake of the observation optical system, and that the processor calculates a shake correction amount according to the shake of the observation optical system based on an output of the shake detection sensor, and moves the display region and displays the display region on the display based on the shake correction amount.

It is preferable that the processor acquires a shake rotation direction and/or a shake rotation angle based on the output of the shake detection sensor, and rotates the display region in a rotation direction opposite to the shake rotation direction. It is preferable that the processor rotates the display region in the rotation direction opposite to the shake rotation direction and at a display rotation angle based on the shake rotation angle.

It is preferable that in a case in which the shake rotation angle is $\alpha°$, the processor rotates the display region in the rotation direction opposite to the shake rotation direction and at the display rotation angle $\alpha \pm 5°$.

It is preferable that the processor moves the display region by summing up the first relative movement amount or the second relative movement amount and the shake correction amount.

It is preferable that in a case in which the display region moved based on the shake correction amount reaches an outside of a displayable range of the display, the processor omits a portion of the display region that protrudes outside the displayable range and displays the obtained display region on the display.

It is preferable that the processor changes a reduction magnification or an enlargement magnification of the display region according to a difference between the measurement distance and the eye point reference value in a stepwise manner.

It is preferable that in a case in which the measurement distance is equal to or less than the eye point reference value, the processor cuts out a part of the display image and displays the obtained display image in the display region.

It is preferable that in a case of changing the reduction magnification or the enlargement magnification, the processor makes a change speed in a case of starting the change higher than a change speed in a case of ending the change.

It is preferable that the processor performs information display on the display, and does not reduce the information display or reduces the information display at a reduction magnification larger than the display region, in a case in which the measurement distance exceeds the eye point reference value.

BRIEF DESCRIPTION OF THE DRAWINGS

FIG. 6 is an explanatory diagram showing a positional relationship between a display (A) and an eye of an imaging person (B) in a case in which a display region is moved within the display based on a first relative movement amount or a second relative movement amount by detecting a relative position between the finder part and the eye of the imaging person.

FIG. 7 is an explanatory diagram showing a positional relationship between a display (A) and an eye of an imaging person (B) in a case in which a display region is not moved within the display even though a position of the eye of the imaging person has moved relative to the finder part.

FIG. 9 is an explanatory diagram showing a state (A) in which a display region where a display image is displayed on a display is reduced and displayed in a case (B) in which a measurement distance exceeds an eye point reference value.

FIG. 10 is an explanatory diagram showing a state (A) in which a display region where a display image is displayed on a display is enlarged and displayed in a case (B) in which a measurement distance is equal to or less than an eye point reference value.

FIG. 13 is an explanatory diagram showing a positional relationship between a display region (A) on a display and an eye of an imaging person (B) in a case in which a shake of a finder part in the third embodiment is zero.

FIG. 14 is an explanatory diagram showing a positional relationship between a display region (A) on a display and an eye of an imaging person (B) in a case in which a shake of a finder part in the third embodiment is S.

FIG. 16 is an explanatory diagram showing a state (A) in which a display image is displayed on a display in a case (B) in which a measurement distance in a second modification example is equal to or less than an eye point reference value.

FIG. 17 is an explanatory diagram showing a state (A) in which a part of the display image is cut out and displayed in a display region in a case (B) in which the measurement distance in the second modification example exceeds an eye point reference value.

FIG. 19 is an explanatory diagram showing a state (A) in which a display image is displayed on a display in a case (B) in which a measurement distance in a fourth modification example is equal to or less than an eye point reference value, the state (A) being a state in which an information display is not reduced, or reduced at a reduction magnification larger than the display region.

DESCRIPTION OF THE PREFERRED EMBODIMENTS

First Embodiment

Configuration of Digital Camera

Figure 1:
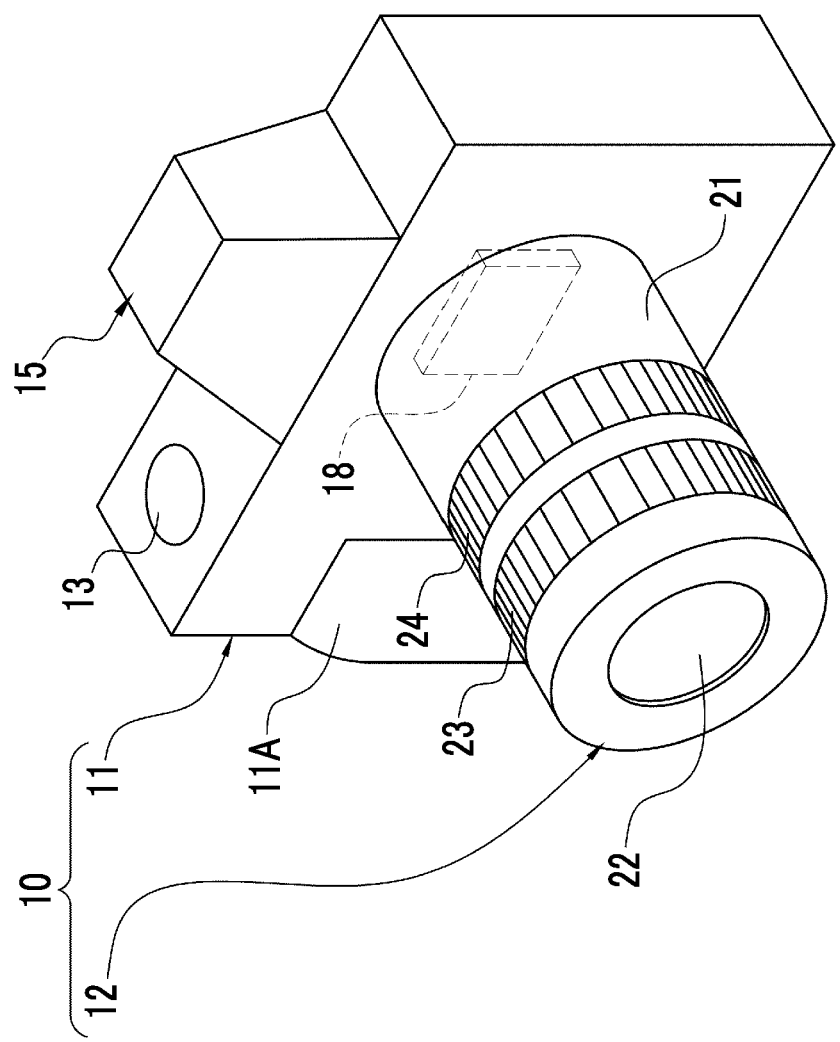
FIG. 1 is a front perspective view of a digital camera.

As shown in FIG. 1, a digital camera 10 comprises a camera body 11 and an interchangeable lens 12. The digital camera 10 is a so-called mirrorless single-lens type digital camera. The digital camera 10 corresponds to a display device within the scope of claims.

Figure 2:
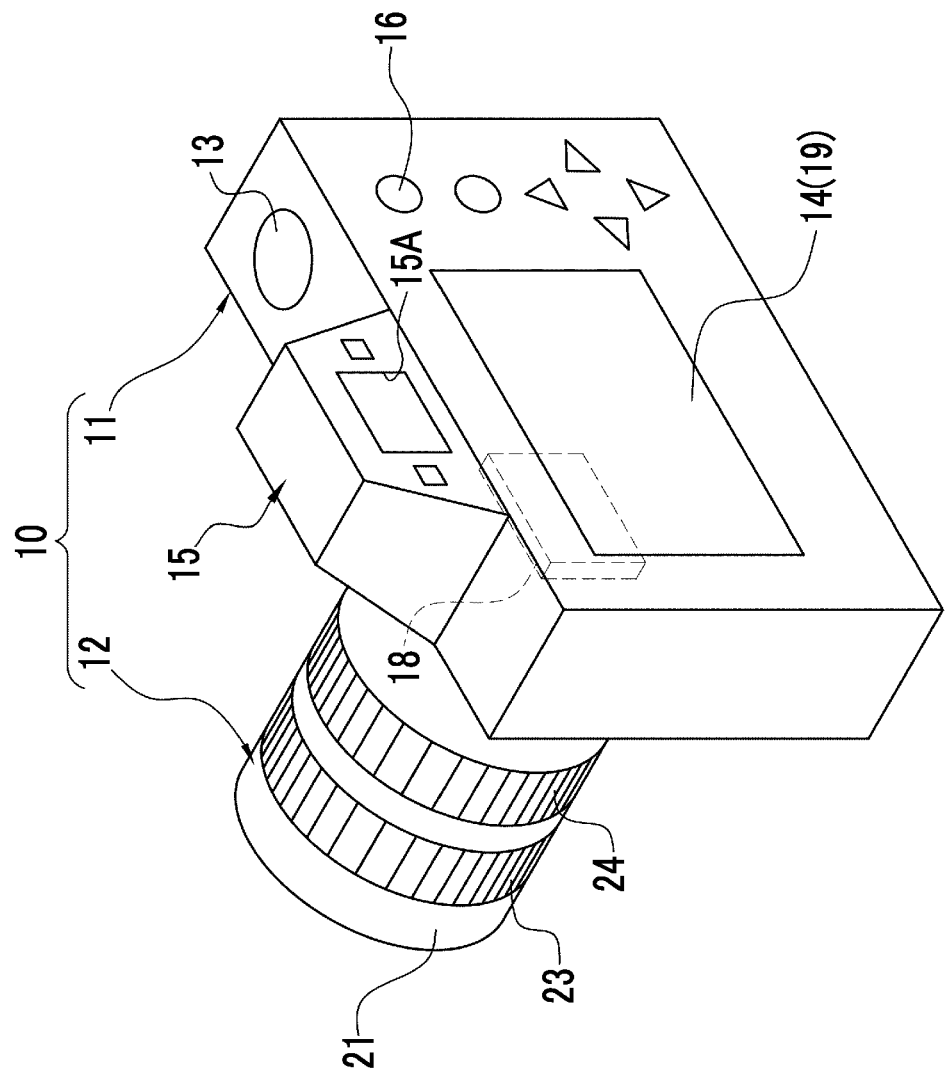
FIG. 2 is a rear perspective view of the digital camera.

As shown in FIG. 2, the camera body 11 comprises a release switch 13, a rear display part 14, a finder part 15, an operation button 16, and the like. A mount 17 (see FIG. 3) is provided on a front surface of the camera body 11. The interchangeable lens 12 is attachably and detachably mounted to the mount 17. The mount 17 is provided with a body-side signal contact 17A (see FIG. 3) for electrical connection and communication with the interchangeable lens 12. In addition, the camera body 11 has a grip portion 11A.

An imaging element 18 is built in the camera body 11. The imaging element 18 is provided behind the mount 17. The imaging element 18 is, for example, a complementary metal oxide semiconductor (CMOS) image sensor, a charge coupled device (CCD) image sensor, or an organic thin film imaging element.

The rear display part 14 is used for displaying a live view image, displaying a captured image, displaying a setting menu, and the like. A touch panel 19 is laminated on a surface of the rear display part 14, and the touch panel 19 and a plurality of the operation buttons 16 are used for various setting operations. The rear display part 14 is formed of, for example, an LCD panel. An input instruction from the release switch 13, the operation button 16, and the touch panel 19 is transmitted to a body controller 41 (see FIG. 3).

The finder part 15 corresponds to an observation optical system within the scope of claims. The finder part 15 is an electronic view finder, and a live view image, which is a subject image captured by the imaging element 18, is displayed on a display 61 (see FIGS. 3 and 4) formed of an LCD disposed in depths of a finder eyepiece window 15A. The finder eyepiece window 15A is provided on a finder eyepiece frame 15B, and an eye of an imaging person contacts with the finder eyepiece window 15A. The finder eyepiece frame 15B is provided integrally with the camera body 11. The imaging person, who is a user, can observe the subject image displayed on the display 61 via the finder eyepiece window 15A.

The interchangeable lens 12 comprises a lens barrel portion 21, an imaging optical system 22, a focus ring 23, a zoom ring 24, a lens mount 25 (see FIG. 3), and the like. The lens barrel portion 21 has a cylindrical shape and houses the imaging optical system 22 inside, and the lens mount 25 is provided at a rear end portion thereof. In a case in which the interchangeable lens 12 is mounted to the camera body 11, the imaging optical system 22 forms an image of subject light on the imaging element 18. The imaging element 18 images light emitted from the interchangeable lens 12. The lens mount 25 is attachably and detachably bonded to the mount 17 of the camera body 11.

Electric Configuration of Digital Camera

Figure 3:
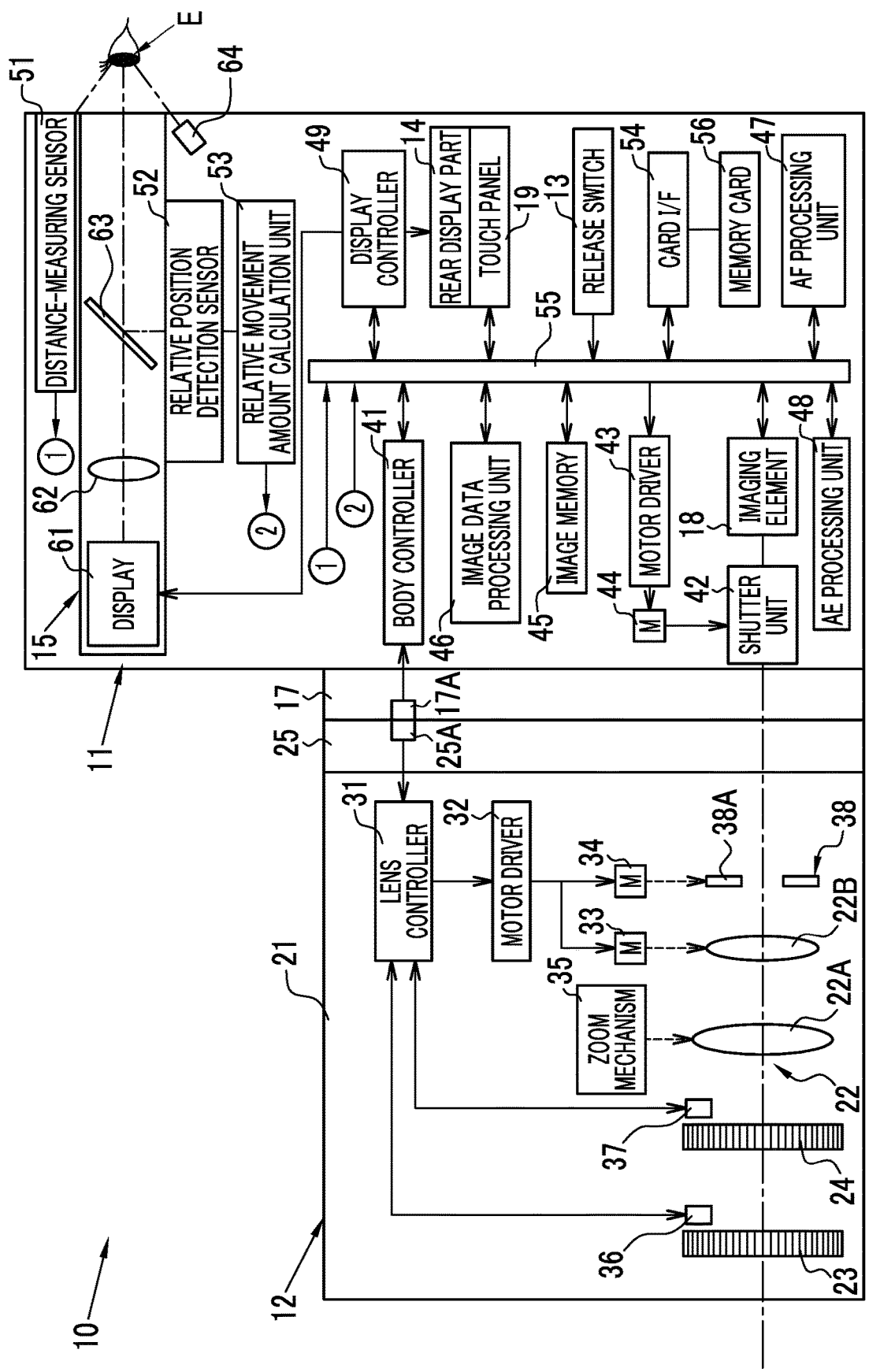
FIG. 3 is a block diagram showing a schematic configuration of the digital camera.

As shown in FIG. 3, the interchangeable lens 12 comprises a lens controller 31, a motor driver 32, motors 33 and 34, a zoom mechanism 35, sensors 36 and 37, and the like, as well as the imaging optical system 22, the focus ring 23, the zoom ring 24, the lens mount 25.

The lens mount 25 is provided with a lens-side signal contact 25A. The body-side signal contact 17A is provided inside the mount 17. In a case in which the lens mount 25 of the interchangeable lens 12 is bonded to the mount 17 of the camera body 11, the lens-side signal contact 25A comes into contact with the body-side signal contact 17A and electrically connects the interchangeable lens 12 and the camera body 11.

The lens controller 31 includes a microcomputer comprising a central processing unit (CPU), a read only memory (ROM) that stores a program and a parameter used in the CPU, a random access memory (RAM) that is used as a work memory of the CPU (none of which is shown), and the like, and controls each part of the interchangeable lens 12. The motor driver 32 and the sensors 36 and 37 are connected to the lens controller 31.

The imaging optical system 22 comprises a plurality of lenses including a focus lens 22B and a variable magnification lens 22A, a stop unit 38, and the like. The focus lens 22B moves in a direction of an optical axis L by being driven by the motor 33, and adjusts a focus of the imaging optical system 22. The stop unit 38 moves a plurality of stop leaf blades 38A by driving the motor 34 and changes the amount of incidence ray to the imaging element 18. The motor driver 32 controls driving of the motors 33 and 34 based on the control of the lens controller 31.

The zoom mechanism 35 is, for example, an electric zoom mechanism that detects a rotational position of the zoom ring 24 with the sensor 37 and moves the variable magnification lens 22A by an actuator or the like according to information on a rotation direction and a rotation amount. The variable magnification lens 22A moves in the direction of the optical axis L by being driven by the zoom mechanism 35 and changes an angle of view. The zoom mechanism 35 is not limited to this, and may be a manual zoom mechanism that moves the variable magnification lens 22A by converting a rotational operation of the zoom ring 24 into linear movement.

The camera body 11 includes a body controller 41, a shutter unit 42, a motor driver 43, a shutter motor 44, an image memory 45, an image data processing unit 46, an autofocus (AF) processing unit 47, an automatic exposure (AE) processing unit 48, a display controller 49, a distance-measuring sensor 51, a relative position detection sensor 52, a relative movement amount calculation unit 53, a card interface (I/F) 54, and the like, as well as the release switch 13, the rear display part 14, the finder part 15, the operation button 16, the imaging element 18, and the touch panel 19, which are described above, and these are connected by a busline 55.

The body controller 41 comprises a CPU, a ROM that stores a program and a parameter used in the CPU, a RAM that is used as a work memory of the CPU (none of which is shown), and the like. The body controller 41 controls each part of the camera body 11 and the interchangeable lens 12 connected to the camera body 11. A shutter signal is input to the body controller 41 from the release switch 13. In addition, the body-side signal contact 17A is connected to the body controller 41.

The body controller 41 transmits a control signal for moving the focus lens 22B according to information on a rotation direction and a rotation amount of the focus ring 23 detected by the sensor 37, to the lens controller 31. The lens controller 31 controls the motor driver 32 based on the control signal to move the focus lens 22B.

The body controller 41 operates the stop unit 38 according to exposure information calculated by the automatic exposure (AEL) processing unit 48, and transmits a control signal for changing a stop diameter to the lens controller 31. The lens controller 31 controls the motor driver 32 based on the control signal, and controls the stop diameter of the stop unit 38 such that an F number calculated by the AE processing unit 48 is obtained.

The AE processing unit 48 calculates, for example, an integrated value of each color signal from image data for one frame. The body controller 41 calculates, for example, an appropriate exposure value based on the integrated value calculated for each image for one frame, and determines an F number such that an appropriate exposure value calculated for a preset shutter speed is achieved. The body controller 41 transmits the control signal to the lens controller 31. The lens controller 31 controls the motor driver 32 based on the control signal, and operates the stop unit 38 according to the stop diameter from which the determined F number can be obtained.

The shutter unit 42 is disposed between the mount 17 and the imaging element 18. The shutter unit 42 is provided to block an optical path between the imaging optical system 22 and the imaging element 18, and changes between an opened state and a closed state. The shutter unit 42 is set to the opened state in a case of capturing a live view image and a video. In a case of capturing a still image, the shutter unit 42 temporarily changes from the opened state to the closed state. The shutter unit 42 is driven by the shutter motor 44. The motor driver 43 controls driving of the shutter motor 44.

The imaging element 18 is driven and controlled by the body controller 41. The imaging element 18 is, for example, a complementary metal oxide semiconductor (CMOS) type image sensor of an advance photo system-classic (APS-C) size, and has a light-receiving surface formed of a plurality of pixels (not shown) arranged in a two-dimensional matrix. Each pixel includes a photoelectric conversion element, and photoelectrically converts a subject image formed on the light-receiving surface by the interchangeable lens 12 to generate an imaging signal. In addition, the imaging element 18 has an electronic shutter function, and the shutter speed (charge accumulation time) can be adjusted.

In addition, the imaging element 18 comprises a noise removal circuit, an auto gain controller, and a signal processing circuit such as an A/D conversion circuit (none of which is shown). The noise removal circuit performs noise removal processing on the imaging signal.

The auto gain controller amplifies a level of the imaging signal to an optimum value. The A/D conversion circuit converts the imaging signal into a digital signal and outputs the converted signal from the imaging element 18 to the busline 55. The output signal of the imaging element 18 is image data (so-called RAW data) having one color signal for each pixel.

The image memory 45 stores image data for one frame output to the busline 55. The image data processing unit 46 reads out image data for one frame from the image memory 45 and performs known image processing such as matrix operation, demosaicing, γ correction, brightness/color difference conversion, and resizing processing. The AF processing unit 47 calculates an AF evaluation value, which is an integrated value of a high-frequency component, from image data for one frame. This AF evaluation value corresponds to a contrast of the image.

In an AF mode, the body controller 41 detects a position (in-focus position) of the focus lens 22B at which the AF evaluation value is the maximum value, based on the AF evaluation value calculated each time an image for one frame is obtained by the AF processing unit 47. The body controller 41 moves the focus lens 22B to the detected in-focus position.

The display controller 49 sequentially inputs the image data for one frame image-processed by the image data processing unit 46, to the rear display part 14 and/or the finder part 15. The rear display part 14 and/or the finder part 15 sequentially display the live view images at regular intervals. In some cases, information images showing various kinds of information are combined and displayed on the live view image.

The card I/F 54 is incorporated in a card slot (not shown) provided in the camera body 11, and is electrically connected to a memory card 56 inserted in the card slot. The card I/F 54 causes the image data image-processed by the image data processing unit 46 to be stored in the memory card 56. In addition, in a case of reproducing and displaying the image data stored in the memory card 56, the card I/F 54 reads out the image data from the memory card 56.

Configuration of Finder Part

Figure 4:
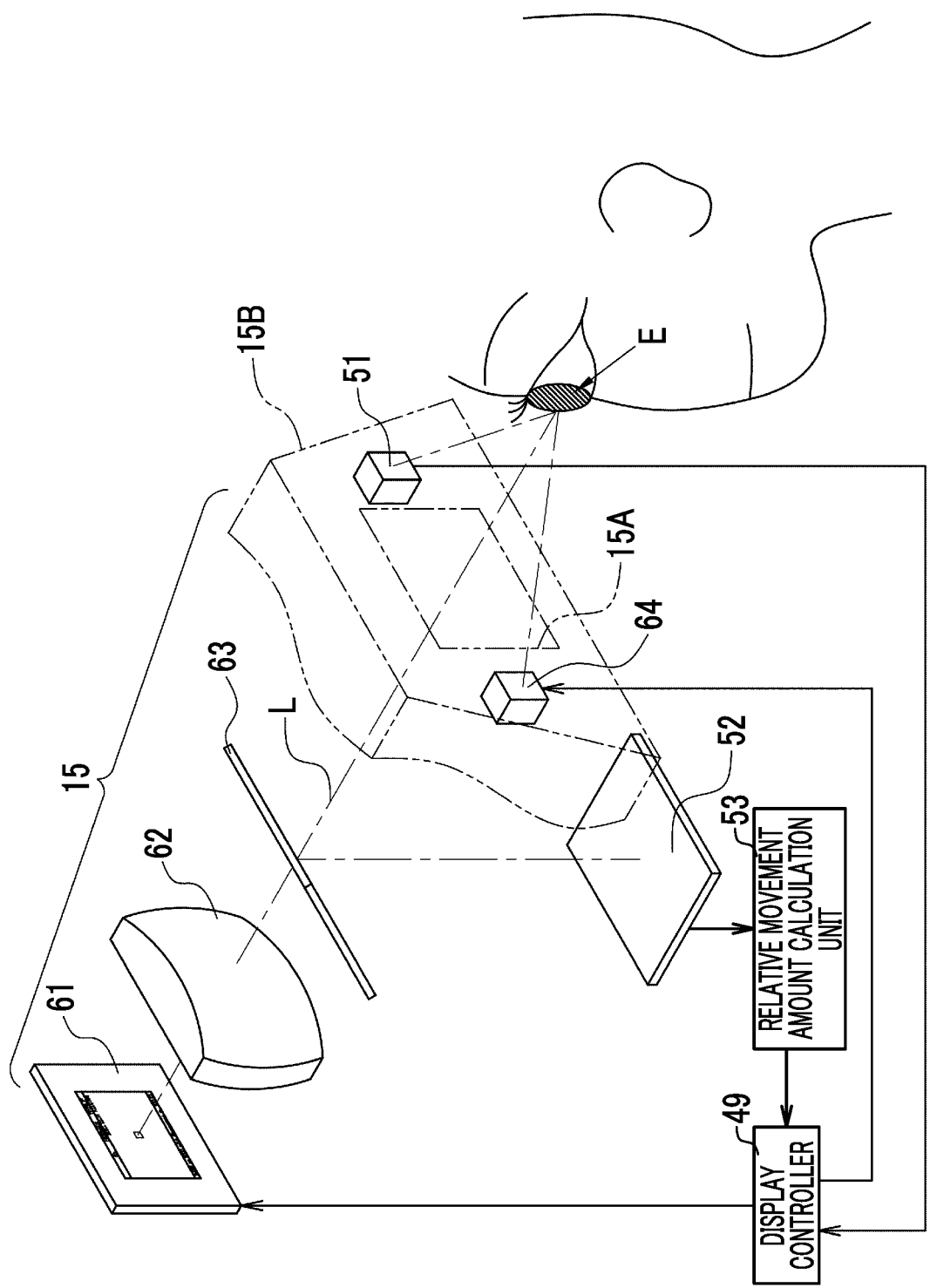
FIG. 4 is a perspective view showing a configuration of a finder part.

As shown in FIG. 4, the finder part 15 comprises the display 61, a finder lens 62, and a half mirror 63. The finder lens 62 is an optical member provided on a rear surface side (a side on which the eye of the imaging person is located) of the display 61 to guide an image displayed on the display 61 to the eye of the imaging person through the finder eyepiece window 15A. The display 61 is, for example, an organic electro luminescence (EL) display or a liquid crystal display. Although the finder lens 62 is shown in FIG. 4 as being composed of one lens, it may be composed of a lens group including a plurality of lenses.

In addition, the half mirror 63 is provided between the display 61 and the finder eyepiece window 15A. The half mirror 63 transmits, for example, visible light and reflects infrared light. Further, a light source 64 that emits infrared light is disposed around an eye E of the imaging person at a predetermined position in a peripheral portion of the finder eyepiece window 15A. Since the half mirror 63 transmits a display image displayed on the display 61, the half mirror 63 does not interfere with the observation by the imaging person. In addition, the half mirror 63 reflects the infrared light reflected around the eye E of the imaging person and forms an image on the relative position detection sensor 52.

The relative position detection sensor 52 is an imaging element, and, as with the imaging element 18 described above, is formed of, for example, a CMOS image sensor, a CCD image sensor, an organic thin film imaging element, or the like. The relative position detection sensor 52 detects a relative position between the finder part 15 and the eye of the imaging person by capturing an image around the eye of the imaging person. Specifically, the relative position detection sensor 52 images the infrared light reflected around the eye E of the imaging person guided by the half mirror 63. The relative position detection sensor 52 outputs the image around the eye of the imaging person to the relative movement amount calculation unit 53.

The relative movement amount calculation unit 53 calculates a first relative movement amount according to the relative position between the finder part 15 and the eye E of the imaging person. Specifically, a coordinate system in an X-axis direction and a Y-axis direction orthogonal to the optical axis L of the finder part 15 is set, a coordinate position from the optical axis L to a center position of the eye of the imaging person is defined as the relative position, and the first relative movement amount is calculated according to the relative position. The optical axis L is an optical axis of the finder part 15 (that is, an optical axis of the finder lens 62), and, in a case in which the center position of the eye E of the imaging person coincides with the optical axis L, the relative position is 0 (origin position) (a state shown in FIG. 5).

The relative movement amount calculation unit 53 calculates the first relative movement amount according to the relative position detected from the image around the eye of the imaging person, and further calculates a second relative movement amount obtained by performing processing with respect to a time direction of the first relative movement amount. For example, in a case in which the relative position between the finder part 15 and the eye of the imaging person is moved from a coordinate X (coordinate before movement) to a coordinate X' (coordinate after movement), the first relative movement amount is dx=X'−X.

The relative movement amount calculation unit 53 performs the processing with respect to the time direction of the first relative movement amount. The processing with respect to the time direction performed by the relative movement amount calculation unit 53 is smoothing processing of smoothing a change in the time direction of the first relative movement amount, and the smoothing processing is processing of performing a product-sum operation, for example, moving average processing.

The relative movement amount calculation unit 53 acquires the first relative movement amount for each unit time in which the display image is displayed on the display 61, for example, for one frame of a live view image or a video, and performs the moving average processing. In this case, in the moving average processing, a product-sum operation of the movement amount and the time in the most recent and latest frames is performed. Then, for example, the first relative movement amounts in the most recent 5 frames are denoted by dx(t−5), dx(t−4), dx(t−3), dx(t−2), and dx(t−1), and the first relative movement amount in the latest frame is denoted by dx(t). In addition, in a case in which the time for one frame is denoted by T, the moving average dx'(t) ={dx(t−5)×T+dx(t−4)×T+dx(t−3)×T+dx(t−2)×T+dx(t−1)

xT+dx(t)×T}/6T. The relative movement amount calculation unit 53 calculates the moving average dx'(t) as the second relative movement amount.

In this way, by averaging the first relative movement amounts for a plurality of frames, it is possible to suppress an influence of a sudden and short-time change in the first relative movement amounts. Therefore, in a case in which an accidental movement of the imaging person (reflective movement such as blinking, or short-time movement such as camera shaking) is performed, a movement of a display region, which will be described below, can be suppressed. In such averaging of the first relative movement amount, it can be said that the moving average processing in the time direction is applied to time-series data of a fluctuation amount. The smoothing processing performed by the relative movement amount calculation unit 53 is not limited to the moving averaging, and product-sum operation processing of a low-pass filter capable of smoothing the time-series data, such as a median filter or a Gaussian filter, can be applied to the calculation of the second relative movement amount.

Further, the relative movement amount calculation unit 53 switches the smoothing processing in the time direction described above according to the change amount of the first relative movement amount. That is, the relative movement amount calculation unit 53 determines whether or not the relative movement is intentional by the imaging person based on whether or not the first relative movement amount dx(t) in the latest frame is larger than a threshold value Xth. Specifically, in a case in which the first relative movement amount dx(t) exceeds the threshold value Xth, the relative movement amount calculation unit 53 outputs the first relative movement amount to the display controller 49 without performing the smoothing processing with respect to the time direction of the first relative movement amount, such as the moving average processing. The display controller 49 moves the display region within the display 61 using a value of the first relative movement amount as it is. On the other hand, in a case in which the first relative movement amount dx(t) is equal to or less than the threshold value Xth, the second relative movement amount is calculated by performing the processing of smoothing the change in the time direction of the first relative movement amount as described above. The relative movement amount calculation unit 53 outputs the second relative movement amount to the display controller 49. The display controller 49 moves the display region within the display 61 using the second relative movement amount.

The threshold value Xth may be a preset value or may be a value input by the imaging person by operating the operation buttons 16 or the touch panel 19. The smoothing processing (moving average processing) with respect to the time direction of the first relative movement amount and the processing of moving the display region within the display 61 may be performed for each of the plurality of frames, not for each frame as described above.

Further, the distance-measuring sensor 51 is provided at the predetermined position in the peripheral portion of the finder eyepiece window 15A. The distance-measuring sensor 51 measures a distance from the finder eyepiece frame 15B to the eye of the imaging person. The distance-measuring sensor 51 comprises a light-receiving element such as a photodiode that receives light reflected around the eye of the imaging person. As light to be emitted around the eye of the imaging person, the light from the light source 64 described above may be used, or another light source may be provided in the distance-measuring sensor 51. The distance-measuring sensor 51 generates an electric signal for indicating a position where an image is formed from the reflected light around the eye of the imaging person, applies a principle of triangular distance measuring, and calculates the distance between the eye of the imaging person and the finder eyepiece frame 15B based on an image forming position of the reflected light.

Operation of Digital Camera

Figure 5:
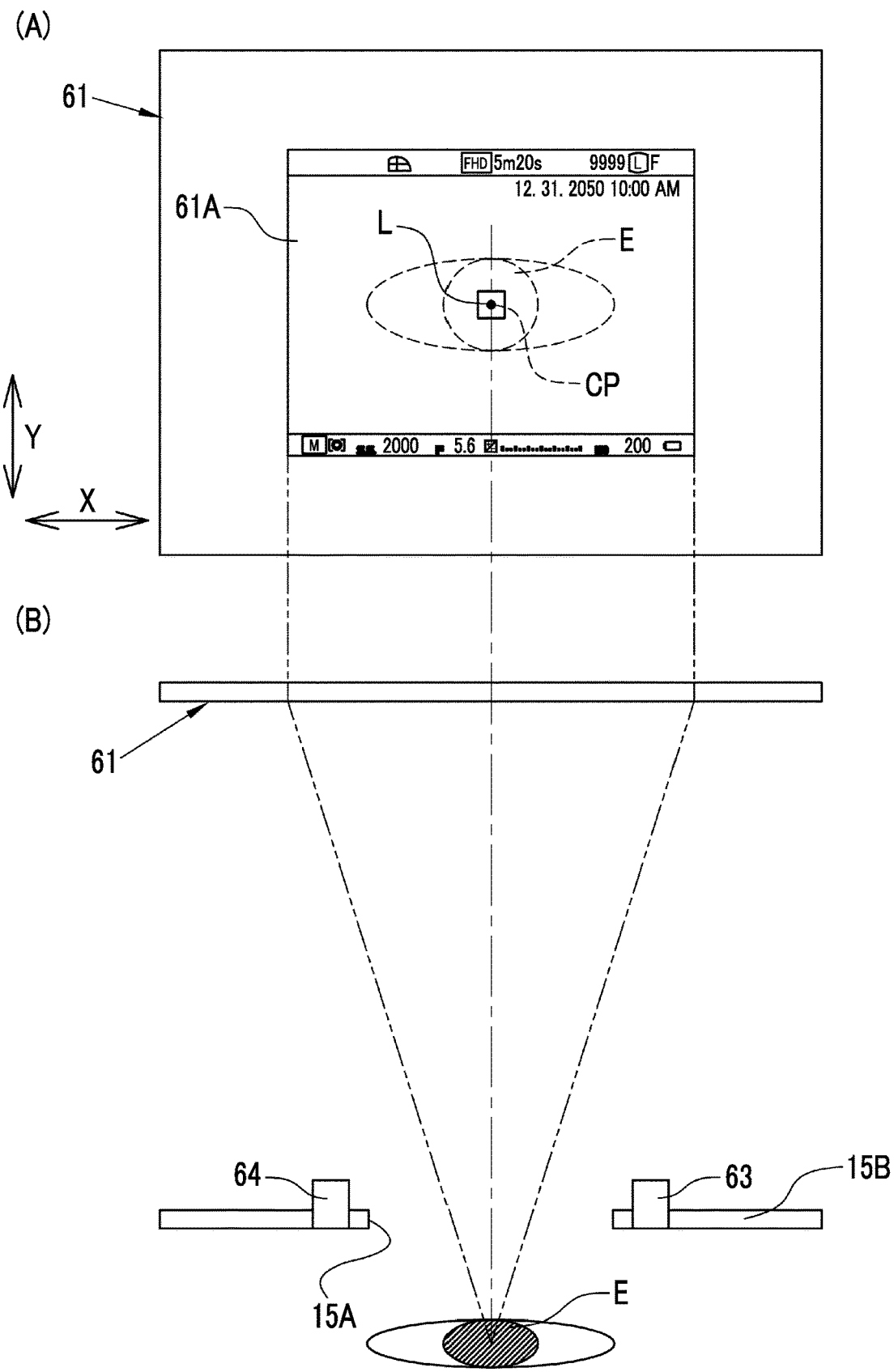
FIG. 5 is an explanatory diagram showing a positional relationship between a display (A) and an eye of an imaging person (B) in a case in which an optical axis of the finder part and a center of the eye of the imaging person are aligned with each other.
Figure 8:
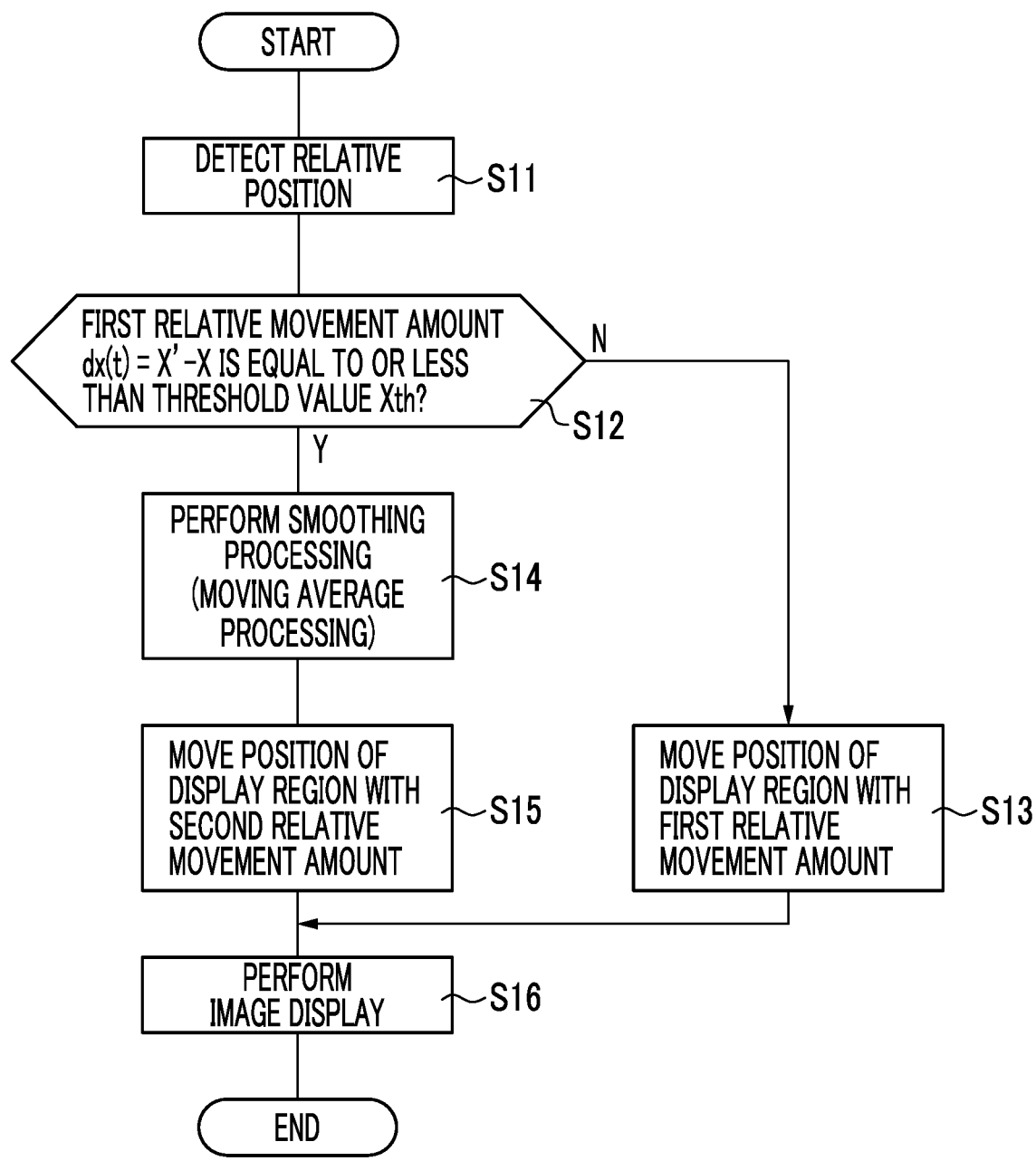
FIG. 8 is a flowchart showing an operation of the digital camera.

An operation of the digital camera 10 according to the present embodiment will be described with reference to explanatory diagrams of FIGS. 5 to 7 and a flowchart of FIG. 8. In a case in which a power switch (not shown) is operated by the imaging person, power is supplied to each part of the digital camera 10. In a case in which the power of the digital camera 10 is turned on, the imaging element 18, the body controller 41, the lens controller 31, and the like are activated. As described above, the light source 64 emits the infrared light, and the relative position detection sensor 52 detects the relative position between the finder part 15 and the eye E of the imaging person (S11). The relative position detection sensor 52 outputs the relative position (the image around the eye of the imaging person) to the relative movement amount calculation unit 53. FIG. 5 shows a case in which the center position CP of the eye E of the imaging person coincides with the optical axis L, and shows a state in which the relative position X is 0 and the first relative movement amount dx is 0 (see (A) of FIG. 5). In addition, in FIG. 6 and FIG. 7, only the relative movement in the X-axis direction is illustrated for convenience of explanation, but the same processing is performed in a case in which there is a relative movement in the Y-axis direction.

As shown in FIG. 6, the relative movement amount calculation unit 53 calculates the first relative movement amount dx(t)=X'−X in the latest frame according to the relative position between the finder part 15 and the eye of the imaging person, and compares the calculated first relative movement amount with the threshold value Xth (S12). In a case in which the first relative movement amount dx(t) exceeds the threshold value Xth (N in S12), it is determined that the relative movement is intentional by the imaging person. Therefore, the display controller 49 moves a position of a display region 61A on the display 61 with the first relative movement amount dx(t) and in a direction opposite to the movement direction of the eye E of the imaging person (S13). That is, the display region 61A is moved by −dx(t) (see (A) of FIG. 6). As a result, since the display region 61A moves relative to the position of the eye E of the imaging person by the amount of the movement of the position of the eye E, the finder eyepiece frame 15B does not block the position of the eye E of the imaging person, and the display region 61A enters a field of view of the eye E of the imaging person. That is, the imaging person can reliably observe the display region 61A in the finder part 15. The display controller 49 continues an image display in which the display region 61A is moved (S16). The display region 61A includes information display such as imaging information, in addition to the captured image (display image) captured by the imaging element 18.

On the other hand, in a case in which the first relative movement amount dx(t) is equal to or less than the threshold value Xth (Y in S12), it is determined that the relative movement is not intentional by the imaging person but includes an accidental movement (blinking of the imaging person or the like). Therefore, the relative movement amount calculation unit 53 performs the smoothing processing (moving average processing) with respect to the time direction of the first relative movement amount dx(t), and calculates the moving average dx'(t) as the second relative movement amount (S14).

The display controller 49 moves the position of the display region 61A on the display 61 with the second relative movement amount dx'(t) and in the direction opposite to the movement direction of the eye E of the imaging person (S15). That is, the display region 61A is moved by −dx'(t) (see (A) of FIG. 6). As a result, since the display region 61A moves relative to the position of the eye E of the imaging person by the amount of the movement of the position of the eye E, the finder eyepiece frame 15B does not block the position of the eye E of the imaging person, and the display region 61A enters the field of view of the eye E of the imaging person (see (B) of FIG. 6). That is, the imaging person can reliably observe the display region 61A in the finder part 15. The display controller 49 continues the image display (S16).

Further, since a value obtained by performing the moving average processing is used as the second relative movement amount dx'(t), it is possible to suppress an influence of the accidental movement that is not intentional by the imaging person. That is, it is possible to suppress a sudden and short-time movement of the display region 61A. As a result, it is possible to improve the visibility of the display region 61A for the imaging person.

In a case in which the position of the display region 61A on the display 61 has not been moved, as shown in FIG. 7, the position of the eye E of the imaging person is shifted relative to the optical axis L by the amount of the movement of the position of the eye E of the imaging person, so that the finder eyepiece frame 15B blocks the position of the eye E of the imaging person. As a result, a part of the display region 61A does not enter the field of view of the eye E of the imaging person. On the other hand, in the present embodiment, as described above, the position of the display region 61A on the display 61 is moved using the first relative movement amount dx(t) or the second relative movement amount dx'(t), so that the imaging person can reliably observe the display region 61A in the finder part 15.

Second Embodiment

In the second embodiment described below, in addition to the configuration of the first embodiment, a configuration in which a size of the display region displayed on the display is changed based on the measurement distance from the finder eyepiece frame to the eye of the imaging person is illustrated. The configuration of each part such as the digital camera 10 and the finder part 15 is the same as that of the first embodiment, and the description thereof is not shown.

As shown in FIGS. 9 and 10, the distance-measuring sensor 51 measures a measurement distance 1 from the finder eyepiece frame 15B to the eye of the imaging person. The display controller 49 changes a display size of the display image to be displayed on the display 61 based on the measurement distance 1 from the finder eyepiece frame 15B to the eye E of the imaging person by the distance-measuring sensor 51. Specifically, the display controller 49 compares the measurement distance 1 measured by the distance-measuring sensor 51 with an eye point reference value EP, and, in a case in which the measurement distance 1 exceeds the eye point reference value EP (state shown in (B) of FIG. 9), the display region 61A where the display image is displayed on the display 61 is reduced and displayed (state shown in (A) of FIG. 9). In this case, an area of the display region 61A with respect to an entire surface of the display 61 is reduced to, for example, 60% and displayed. The eye point reference value may be a value set in advance based on a dimension or the like of each part of the finder part 15, or may be a value input by the imaging person by operating the operation button 16 or the touch panel 19.

In a case in which, despite the fact that the measurement distance 1 exceeds the eye point reference value, the display region 61A where the display image is displayed on the display 61 is not reduced and is displayed on the entire surface of the display 61 or at a display magnification close to the entire surface of the display 61, the finder eyepiece frame 15B blocks the field of view of the eye E of the imaging person, and a peripheral part of the display region 61A cannot be visually recognized.

In addition, the digital camera in the related art has an operation button for switching a display magnification of the display, but, for example, in a case in which the position of the eye of the imaging person is farther than the eye point reference value, the operation button is operated to reduce the display magnification, and then, in a case in which the eye of the imaging person is brought closer to the eye point reference value, it is necessary to increase the display magnification again with the operation button, which requires a laborious operation. In addition, the digital camera may lose a gaze point while the display magnification is switched by operating the operation button, thereby missing a shutter chance. In a case in which a long-range subject, especially a wild bird, is imaged, it is necessary to alternately view the finder part and the subject with the naked eye, and it is difficult to bring the eye of the imaging person close to the finder part immediately after viewing the subject with the naked eye, so that the finder part has to be observed at a position farther than the eye point reference value. In the digital camera in the related art in such a case, it is necessary to perform the operation using the operation button, and it is difficult to fit the subject in the display region in the finder part.

On the other hand, in the present embodiment, the display region 61A where the display image is displayed on the display 61 is reduced based on the measurement distance 1 from the finder eyepiece frame 15B to the eye of the imaging person by the distance-measuring sensor 51, so that the finder eyepiece frame 15B does not block the position of the eye E of the imaging person, and the entire display region 61A enters the field of view of the eye E of the imaging person. That is, the imaging person can reliably observe the display region 61A of the finder part 15. In addition, in the present embodiment, since the change of the display magnification with the operation button need not be performed, a shutter chance is not missed. In particular, the present embodiment is effective in observing a subject, such as a moving human or a fast-moving animal such as a bird, in the display region 61A of the finder part 15.

On the other hand, as shown in FIG. 10, the display controller 49 performs a control of enlarging the display region 61A in a case in which the measurement distance 1 is equal to or less than the eye point reference value EP. In this case, the entire surface of the display 61 or a portion close to the entire surface of the display 61 enters the field of view of the eye E of the imaging person. That is, the imaging person can observe the display region 61A in the finder part 15 reliably and with a size appropriate for the imaging person to visually recognize. In this case, an area of the display region 61A with respect to an entire surface of the display 61 is enlarged to, for example, 100% and displayed.

In the second embodiment described above, the display controller 49 illustrates a case in which the display region 61A is reduced or enlarged by comparing the measurement distance with the eye point reference value, but the present invention is not limited to this, and the display controller 49 may change a reduction magnification or an enlargement magnification of the display region according to the difference between the measurement distance 1 and the eye point reference value EP in a stepwise manner. In this case, for example, in a case in which the measurement distance 1 exceeds the eye point reference value EP, the minimum reduction magnification is 0.5×, and, in a case in which the measurement distance 1 is equal to or less than the eye point reference value EP, the maximum enlargement magnification is 1.0×. Then, the display controller 49 may change the display magnification in a stepwise manner such that the reduction magnification or the enlargement magnification of the display region is 0.5×, 0.6×, 0.7×, 0.8×, 0.9×, and 1.0× according to the difference between the measurement distance 1 and the eye point reference value EP.

Figure 11:
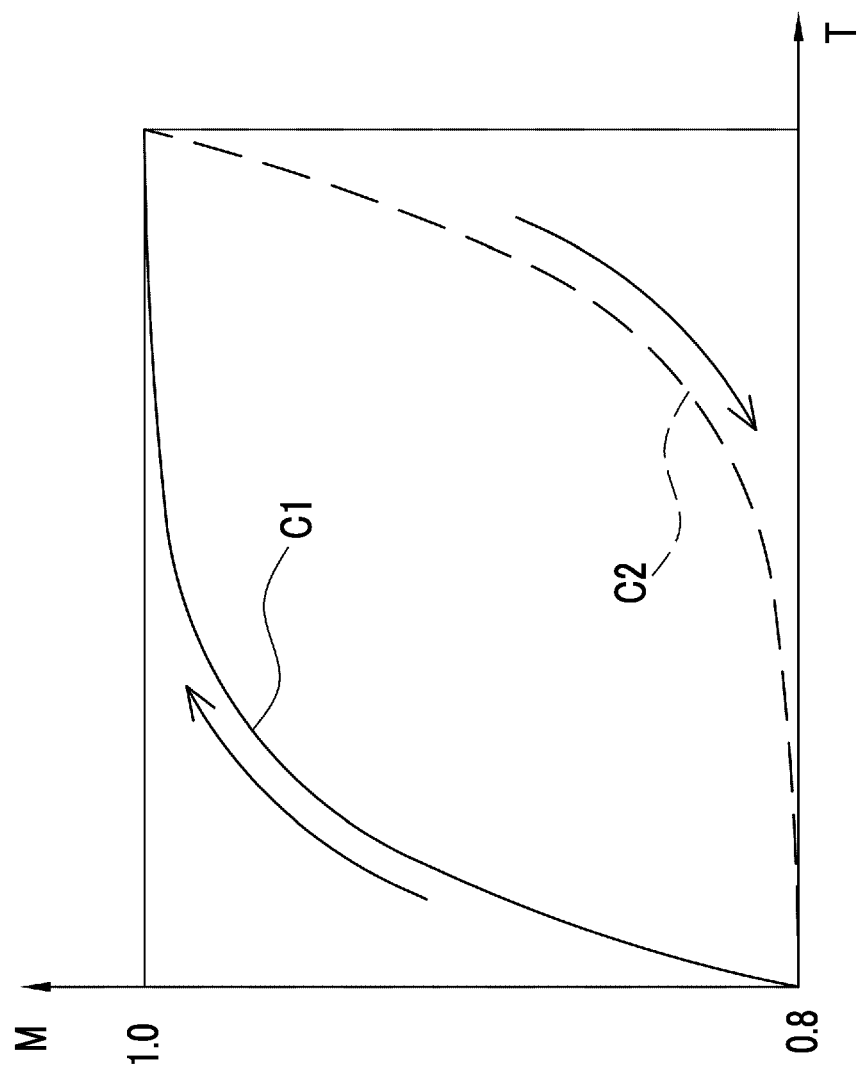
FIG. 11 is a graph showing a relationship between a time and a change speed of a reduction magnification or an enlargement magnification in a case in which the enlargement magnification or the reduction magnification of the display region is changed.

In addition, as shown in FIG. 11, in a case of changing the reduction magnification or the enlargement magnification of the display region 61A, the reduction magnification or the enlargement magnification may be changed in a curvilinear manner. The change of the enlargement magnification of the display region 61A is shown by a curve C1 in FIG. 11. In this case, a magnification M changes from 0.8× to 1.0× with respect to a time T. As shown by the curve C1, a change speed in a case of starting the change of the enlargement magnification of the display region 61A is made higher than a change speed in a case of ending the change.

In addition, the change of the reduction magnification of the display region 61A is shown by a curve C2 in FIG. 11. In this case, the magnification M changes from 1.0× to 0.8× with respect to the time T. As shown by the curve C2, a change speed in a case of starting the change of the reduction magnification of the display region 61A is made higher than the change speed in a case of ending the change. As described above, by making the speed at which the change is started higher than the speed at which the change is ended, an apparent change in magnification is more easily felt. That is, the imaging person does not feel stress because the change in magnification of the display region 61A is perceived quickly.

Third Embodiment

In the first and second embodiments, the first relative movement amount or the second relative movement amount is calculated according to the relative position between the finder part 15 and the eye E of the imaging person, and the display region 61A is moved within the display 61 based on the first relative movement amount or the second relative movement amount, but the present invention is not limited to this, and a shake detection sensor that detects a shake of the finder part may be provided, a shake correction amount may be calculated based on an output of the shake detection sensor, and the display region may be moved within the display based on the shake correction amount.

Figure 12:
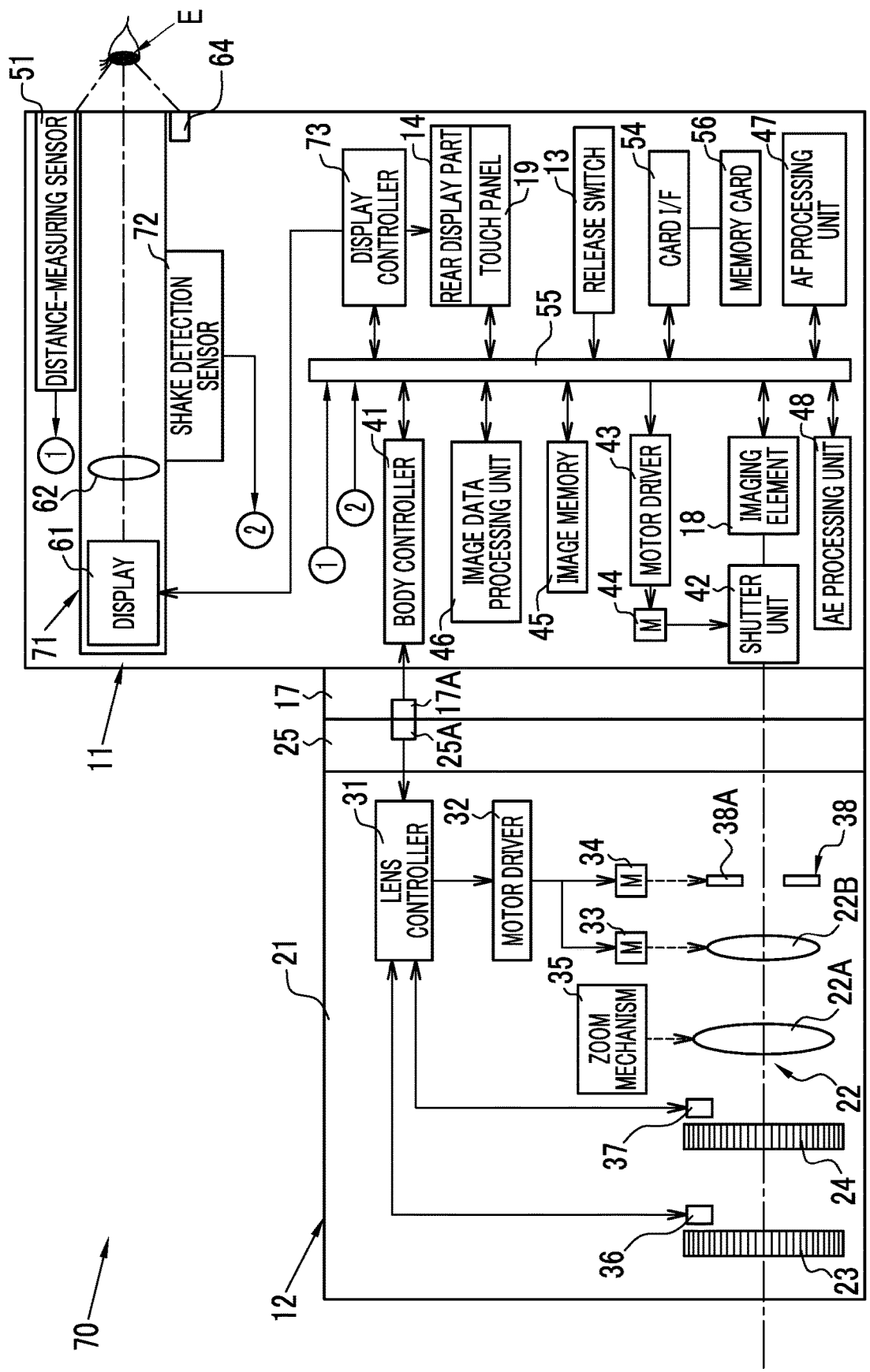
FIG. 12 is a block diagram showing a schematic configuration of a digital camera in a third embodiment.

As shown in FIG. 12, the digital camera 70 according to the present embodiment comprises a finder part 71, a shake detection sensor 72, and a display controller 73, instead of the finder part 15, the relative position detection sensor 52, the relative movement amount calculation unit 53, and the display controller 49 in the digital camera 10 according to the first embodiment. The configuration other than the finder part 71, the shake detection sensor 72, and the display controller 73 is the same as that of the above-described embodiment, and the description thereof is not shown.

The finder part 71 comprises a display 61 and a finder lens 62. That is, the finder part 71 has the same configuration as the finder part 15 in the first embodiment, except that the half mirror 63 is omitted. The finder part 71 corresponds to an observation optical system within the scope of claims.

The shake detection sensor 72 detects a shake of the finder part 71. The shake detection sensor 72 is formed of an acceleration sensor, a gyro sensor, or the like, similarly to a sensor that detects a camera shake of the camera body 11 or the interchangeable lens 12. In addition, a sensor provided as a camera shake detection sensor for the camera body 11 or the interchangeable lens 12 may be used as the shake detection sensor 72. The shake detection sensor 72 outputs the shake of the finder part 71 to the display controller 73.

The display controller 73 calculates a shake correction amount according to the shake of the finder part 71 based on the output of the shake detection sensor 72, and moves the display region 61A and displays the display region 61A on the display 61 based on the shake correction amount. As shown in FIGS. 13 and 14, the shake detection sensor 72 detects the shake of the finder part 71. FIG. 13 shows a state in which there is no shake (value is 0) of the finder part 71, and FIG. 14 shows a state in which the shake detected by the shake detection sensor 72 is S.

As shown in FIG. 13, since the shake of the finder part 71 is 0, the display controller 73 causes the display 61 to display the display region 61A with the shake correction amount of 0, that is, with a kept initial position of the display region 61A without movement, based on the output of the shake detection sensor 72. In this case, the center of the display region 61A coincides with the position of the optical axis L.

As shown in FIG. 14, since the shake of the finder part 71 is S, the display controller 73 calculates the shake correction amount as S based on the output of the shake detection sensor 72, and moves the display region 61A and displays the display region 61A on the display 61 based on the shake correction amount S. Specifically, the display controller 73 moves the position of the display region 61A on the display 61 with the shake correction amount S and in a direction opposite to a direction in which the shake of the finder part 71 occurs (a direction in which the finder part 71 moves).

In a case in which the position of the eye of the imaging person is distant from the finder part 71 (in a case in which the position of the eye of the imaging person is farther than the eye point reference value), the finder part 71 cannot be held and the camera shake is likely to occur.

In a case in which the digital camera of the present embodiment is operated, the shake detection sensor 72 detects the shake of the finder part 71 as described above. As a result, since the display region 61A is moved based on the shake correction amount S by the amount of the shake of the finder part 71, the display region 61A appears stationary (not moved) to the imaging person. Accordingly, the imaging person can reliably observe the display region 61A in the finder part 15.

First Modification Example

Figure 15:
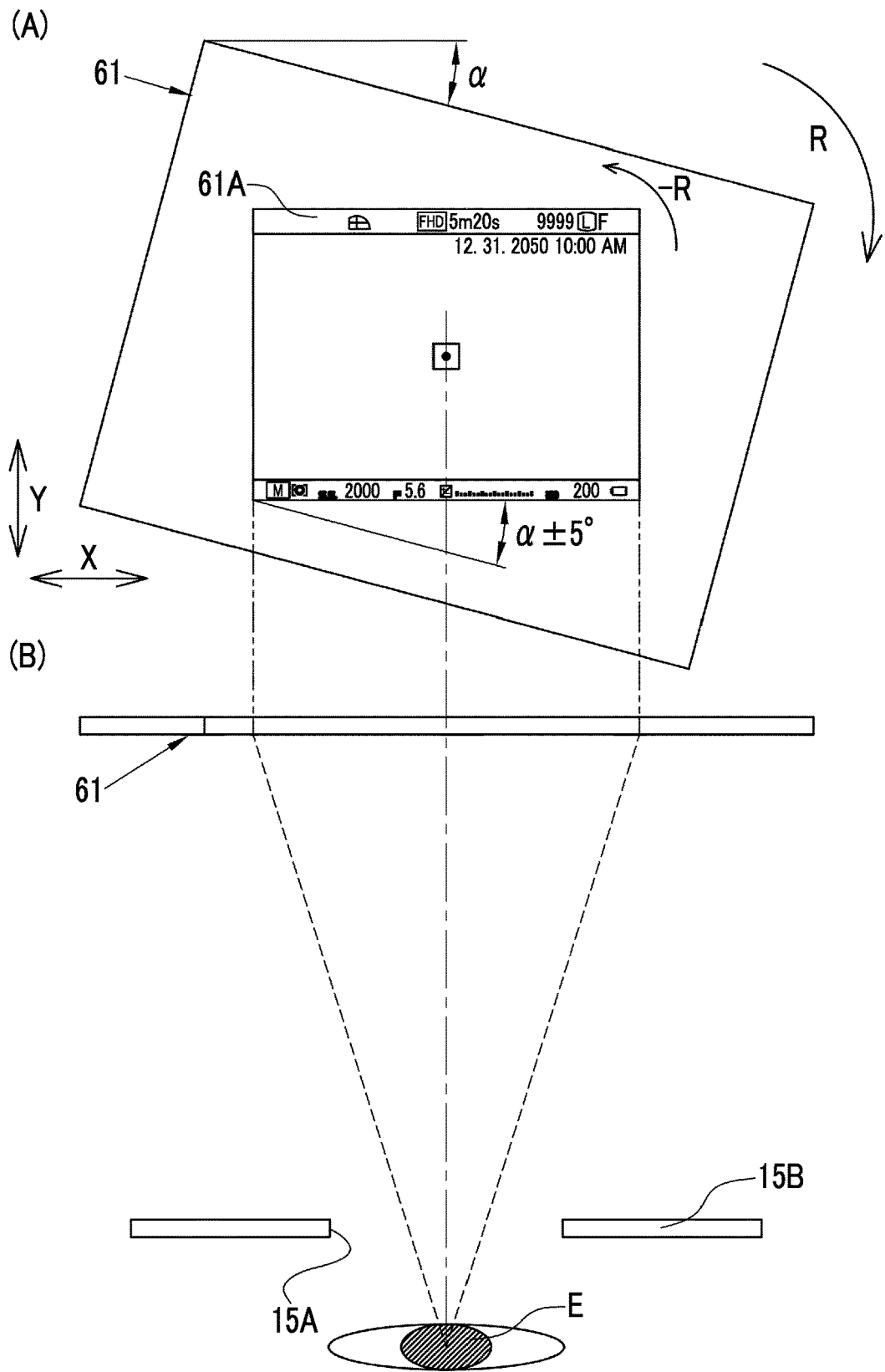
FIG. 15 is an explanatory diagram showing a positional relationship between a display region (A) on a display and an eye of an imaging person (B) in a case in which a shake rotation direction of a finder part in a first modification example is R and a shake rotation angle α is achieved.

As a modification example of the third embodiment, as shown in FIG. 15, the display controller 73 may acquire a shake rotation direction R and/or a shake rotation angle α of the finder part 71 based on the output of the shake detection sensor 72, and rotate the display region 61A in a rotation direction opposite to the shake rotation direction R.

In the modification example shown in FIG. 15, the display region 61A is rotated at a display rotation angle based on the shake rotation angle α in the rotation direction opposite to the shake rotation direction R. Specifically, in a case in which the shake rotation angle is α°, the display region 61A is rotated in the rotation direction opposite to the shake rotation direction R and at the display rotation angle α±5°. As a result, the display region 61A remains horizontal and appears stationary (not rotated) to the imaging person. Accordingly, the imaging person can reliably observe the display region 61A in the finder part 15. The setting of the display rotation angle of α±5° includes allowing an error in a case in which it is difficult to detect the shake rotation angle α with high accuracy.

A configuration of the second embodiment, that is, a configuration in which a size of the display region displayed on the display is changed based on the measurement distance from the finder eyepiece frame to the eye of the imaging person may be added to the configuration of the third embodiment.

Second Modification Example

In each of the above-described embodiments, the size of the display region 61A displayed on the display 61 is changed based on the measurement distance 1 from the finder eyepiece frame 15B to the eye E of the imaging person, but the present invention is not limited to this, and the content displayed on the display 61 may be changed. In the example shown in FIGS. 16 and 17, in a case in which the measurement distance 1 is equal to or less than the eye point reference value EP, the display controllers 49 and 73 display the display region 61A on the entire surface of the display 61 or at a display magnification close to the entire surface, and, in a case in which the measurement distance 1 exceeds the eye point reference value EP, the display controllers 49 and 73 cut out a part of the display image and display the obtained display image in the display region.

Specifically, as shown in FIG. 16, in a case in which the measurement distance 1 is equal to or less than the eye point reference value EP, the display controllers 49 and 73 display the display region 61A on the entire surface of the display 61 or at a display magnification close to the entire surface, for example, enlarge the display region 61A to 100% for display. As a result, the imaging person can observe the display region 61A in the finder part 15 reliably and with a size appropriate for the imaging person to visually recognize. In the example shown in FIG. 16, a person is imaged as the subject P.

On the other hand, as shown in FIG. 17, in a case in which the measurement distance 1 exceeds the eye point reference value EP, the display controllers 49 and 73 cut out an area near the eye E1 of the subject P as a part of the display image and display the obtained display image in an enlarged manner in the display region 61A. In this case, for example, an image around an eye of a person, an animal, or the like is detected by a well-known pupil detection technique, template matching, or the like. As a result, the imaging person cannot visually recognize the entire subject P, but can visually recognize an important portion (near the eye E1 of the subject P), so that the subject P is fitted in the display region 61A in the finder part.

Third Modification Example

Figure 18:
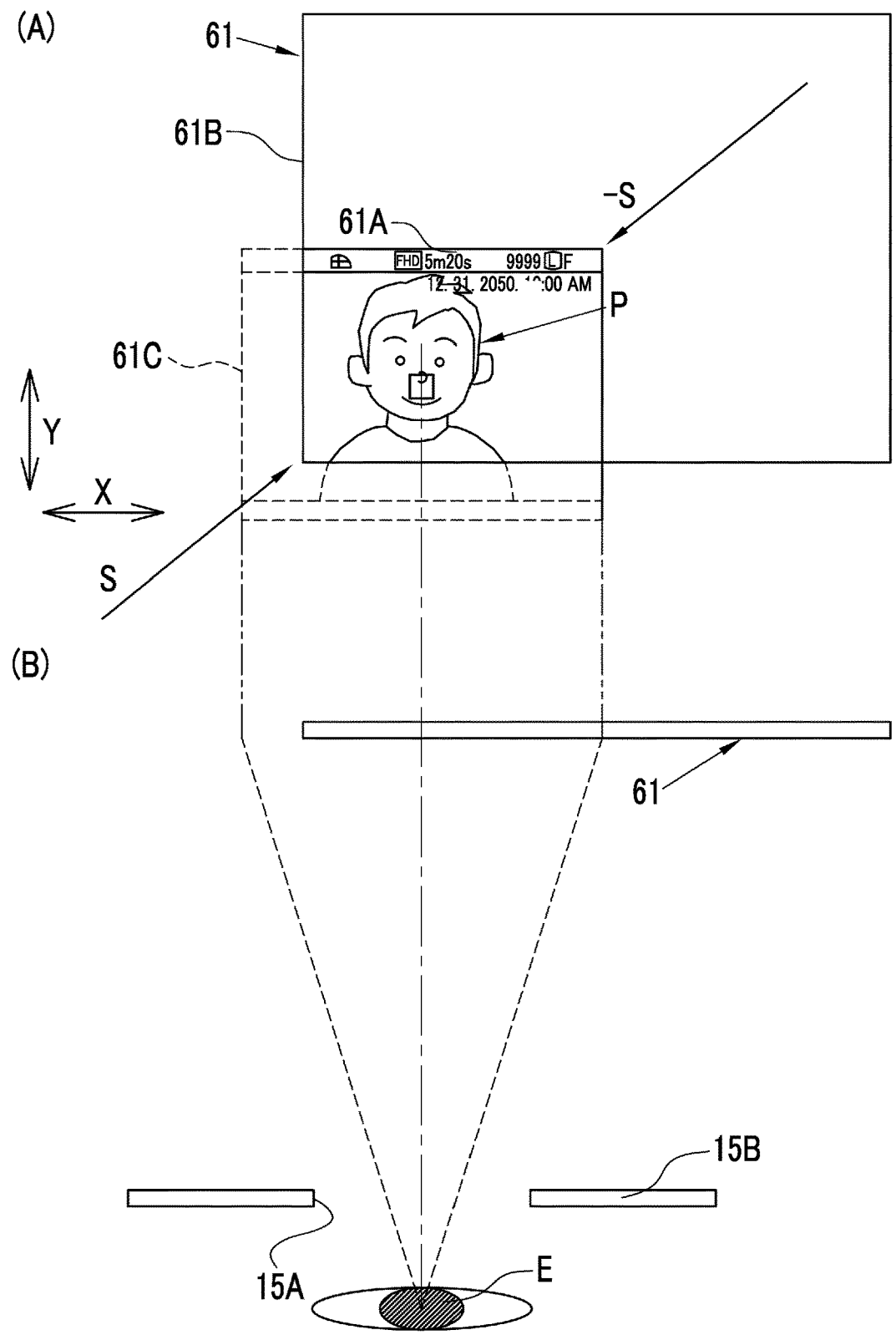
FIG. 18 is an explanatory diagram showing a positional relationship between a display region (A) on a display and an eye of an imaging person (B) in a case in which a shake of a finder part in a third modification example is S, and an explanatory diagram showing a state in which a portion of the display region that protrudes outside a displayable range of the display is omitted and displayed on the display in a case in which the display region reaches an outside of the displayable range.

In the third embodiment, the display controller 73 calculates a shake correction amount according to the shake of the finder part 71 based on the output of the shake detection sensor 72, and moves the display region 61A and displays the display region 61A on the display 61 based on the shake correction amount. As shown in FIG. 18, in a case in which the display region 61A moved based on the shake correction amount reaches an outside of a displayable range of the display 61, a portion of the display region 61A that protrudes outside the displayable range may be omitted and displayed on the display 61.

Since the shake of the finder part 71 is S, the display controller 73 moves the position of the display region 61A on the display 61 with the shake correction amount S and in a direction opposite to a direction in which the shake of the finder part 71 occurs (a direction in which the finder part 71 moves). In this case, the display region 61A moved based on the shake correction amount reaches an outside of a displayable range 61B of the display 61. That is, since a part 61C (a part indicated by a broken line) of the display region 61A protrudes from the displayable range 61B, this part is omitted.

Fourth Modification Example

In each of the above-described embodiments, in a case in which the size of the display region 61A displayed on the display 61 is reduced based on the measurement distance 1 from the finder eyepiece frame 15B to the eye E of the imaging person, the information display such as imaging information is also reduced along with the captured image, but the present invention is not limited to this. The display region 61A need only include any one of a captured image, an information display such as an on-screen display (OSD), or an image created by computer graphics (CG) or the like. For example, as shown in FIG. 19, in a case in which the measurement distance 1 from the finder eyepiece frame 15B to the eye E of the imaging person exceeds the eye point reference value, an information display 61D may not be reduced or may be reduced at a reduction magnification larger than the display region 61A. In this case, the reduced display region 61A includes only the captured image (display image) captured by the imaging element 18.

Fifth Modification Example

The first and second embodiments may be combined with the third embodiment. That is, both the configuration in which the first relative movement amount or the second relative movement amount is calculated according to the relative position between the finder part and the eye of the imaging person, and the display region 61A is moved within the display 61 based on the first relative movement amount or the second relative movement amount, and the configuration in which the shake detection sensor that detects the shake of the finder part is provided, the shake correction amount is calculated based on an output of the shake detection sensor, and the display region 61A is moved within the display 61 based on the shake correction amount may be provided. In this case, it is preferable that the display controller moves the display region 61A by summing up the first relative movement amount or the second relative movement amount and the shake correction amount.

In each of the above-described embodiments, a hardware structure of a processing unit that executes various kinds of processing, such as the lens controller 31, the body controller 41, and the display controller 49, is various processors as shown below. The various processors include a central processing unit (CPU) that is a general-purpose processor executing software (program) to function as various processing units, a graphical processing unit (GPU), a programmable logic device (PLD) that is a processor of which a circuit configuration can be changed after manufacturing such as a field programmable gate array (FPGA), a dedicated electric circuit that is a processor having a circuit configuration designed to be dedicated to executing various kinds of processing, and the like.

One processing unit may be configured of one of these various processors, or may be configured of a combination of two or more processors of the same type or different types (for example, a plurality of FPGAs, a combination of a CPU and an FPGA, or a combination of a CPU and a GPU). In addition, a plurality of processing units may be configured of one processor. As an example in which the plurality of processing units are configured of one processor, first, as typified by computers such as a client or a server, one processor is configured of a combination of one or more CPUs and software, and this processor functions as the plurality of processing units. Second, as typified by a system on chip (SoC) or the like, a processor that realizes the functions of the entire system including the plurality of processing units by using one integrated circuit (IC) chip is used. As described above, the various processing units are configured by using one or more of the above-described various processors as a hardware structure.

Further, the hardware structure of these various processors is more specifically an electric circuit (circuitry) in a form in which circuit elements such as semiconductor elements are combined.

In each of the above-described embodiments, a mirrorless single-lens type digital camera has been described as an example, but the present invention can also be applied to a display device including other imaging devices such as a single-lens reflex type digital camera, a compact type digital camera, a smartphone, augmented reality (AR) glasses having a camera function, or mixed reality (MR) glasses.

In addition, the present invention can also be applied to a display device that does not include an imaging device. That is, any display device may be used as long as it has an observation optical system, and can also be applied to AR glasses, MR glasses, a tablet terminal, or the like that does not have a camera function. In addition, each of the above-described embodiments is an example of the present invention, and each embodiment can be combined and implemented as appropriate.

EXPLANATION OF REFERENCES

10: digital camera
11: camera body
11A: grip portion
12: interchangeable lens
13: release switch
14: rear display part
15: finder part
15A: finder eyepiece window
15B: finder eyepiece frame
16: operation button
17: mount
17A: body-side signal contact
18: imaging element
19: touch panel
21: lens barrel portion
22: imaging optical system
22A: variable magnification lens
22B: focus lens
23: focus ring
24: zoom ring
25: lens mount
25A: lens-side signal contact
31: lens controller
32: motor driver
33, 34: motor
35: zoom mechanism
36, 37: sensor
38: stop unit
38A: stop leaf blade
41: body controller
42: shutter unit
43: motor driver
44: shutter motor
45: image memory
46: image data processing unit
47: autofocus (AF) processing unit
48: automatic exposure (AE) processing unit
49: display controller
51: distance-measuring sensor
52: relative position detection sensor
53: relative movement amount calculation unit
54: card interface (I/F)
55: busline
56: memory card
61: display
61A: display region
61B: displayable range
61C: part
61D: information display
62: finder lens
63: half mirror
64: light source
70: digital camera
71: finder part
72: detection sensor
73: display controller

What is claimed is:

1. A display device comprising:
an observation optical system including a display and an optical member;
a distance-measuring sensor that measures a distance from the observation optical system to an eye of an imaging person;
a relative position detection sensor that detects a relative position between the observation optical system and the eye of the imaging person; and
a processor,
wherein the processor is configured to:
calculate a first relative movement amount according to the relative position detected by the relative position detection sensor;
calculate a second relative movement amount obtained by performing processing with respect to a time direction of the first relative movement amount; and
move a display region within the display based on the second relative movement amount.

2. The display device according to claim 1,
wherein the processing with respect to the time direction is processing of smoothing a change in the time direction of the first relative movement amount.

3. The display device according to claim 2,
wherein the processing of smoothing the change is processing of performing a product-sum operation.

4. The display device according to claim 3,
wherein the processing of performing the product-sum operation is low pass filtering or moving averaging.

5. The display device according to claim 4,
wherein the processor is configured to change a display size of a display image based on a measurement distance.

6. The display device according to claim 5,
wherein the processor is configured to:
   compare the measurement distance measured by the distance-measuring sensor with an eye point reference value;
   reduce the display region where the display image is displayed on the display in a case in which the measurement distance exceeds the eye point reference value; and
   enlarge the display region in a case in which the measurement distance is equal to or less than the eye point reference value.

7. The display device according to claim 6,
wherein the processor is configured to switch the processing in the time direction according to a change amount of the first relative movement amount.

8. The display device according to claim 7,
wherein the processor is configured to move the display region based on the first relative movement amount without performing the processing of smoothing the change with respect to the first relative movement amount, in a case in which the first relative movement amount exceeds a threshold value.

9. The display device according to claim 8, further comprising:
a shake detection sensor that detects a shake of the observation optical system,
wherein the processor is configured to:
   calculate a shake correction amount according to the shake of the observation optical system based on an output of the shake detection sensor; and
   move the display region and display the display region on the display based on the shake correction amount.

10. The display device according to claim 9,
wherein the processor is configured to:
   acquire a shake rotation direction and/or a shake rotation angle based on the output of the shake detection sensor; and
   rotate the display region in a rotation direction opposite to the shake rotation direction.

11. The display device according to claim 10,
wherein the processor is configured to rotate the display region in the rotation direction opposite to the shake rotation direction and at a display rotation angle based on the shake rotation angle.

12. The display device according to claim 11,
wherein the processor is configured to, in a case in which the shake rotation angle is $\alpha°$, rotate the display region in the rotation direction opposite to the shake rotation direction and at the display rotation angle $\alpha \pm 5°$.

13. The display device according to claim 12,
wherein the processor is configured to move the display region by summing up the first relative movement amount or the second relative movement amount and the shake correction amount.

14. The display device according to claim 13,
wherein the processor is configured to, in a case in which the display region moved based on the shake correction amount reaches an outside of a displayable range of the display, omit a portion of the display region that protrudes outside the displayable range and display the obtained display region on the display.

15. The display device according to claim 14,
wherein the processor is configured to change a reduction magnification or an enlargement magnification of the display region according to a difference between the measurement distance and the eye point reference value in a stepwise manner.

16. The display device according to claim 15,
wherein the processor is configured to, in a case in which the measurement distance is equal to or less than the eye point reference value, cut out a part of the display image and display the obtained display image in the display region.

17. The display device according to claim 15,
wherein the processor is configured to, in a case of changing the reduction magnification or the enlargement magnification, make a change speed at starting the change higher than a change speed at ending the change.

18. The display device according to claim 15,
wherein the processor is configured to:
   perform information display on the display; and
   do not reduce the information display or reduce the information display at a reduction magnification larger than the display region, in a case in which the measurement distance exceeds the eye point reference value.

* * * * *